US009413538B2

(12) United States Patent
Baumann et al.

(10) Patent No.: US 9,413,538 B2
(45) Date of Patent: Aug. 9, 2016

(54) CRYPTOGRAPHIC CERTIFICATION OF SECURE HOSTED EXECUTION ENVIRONMENTS

(75) Inventors: Andrew A. Baumann, Redmond, WA (US); Galen C. Hunt, Bellevue, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 13/323,465

(22) Filed: Dec. 12, 2011

(65) Prior Publication Data
US 2013/0151846 A1 Jun. 13, 2013

(51) Int. Cl.
*H04L 9/32* (2006.01)
*G06F 21/57* (2013.01)

(52) U.S. Cl.
CPC ............ *H04L 9/3263* (2013.01); *G06F 21/577* (2013.01); *G06F 2221/034* (2013.01)

(58) Field of Classification Search
USPC .......................... 713/150, 156, 172, 182, 185
See application file for complete search history.

(56) References Cited

U.S. PATENT DOCUMENTS

| 4,874,164 A | 10/1989 | Miner et al. |
| 5,754,830 A | 5/1998 | Butts et al. |
| 5,815,686 A | 9/1998 | Earl et al. |
| 5,819,091 A | 10/1998 | Arendt et al. |
| 5,926,631 A | 7/1999 | McGarvey |
| 6,357,003 B1 | 3/2002 | Zarrin et al. |
| 6,546,425 B1 | 4/2003 | Hanson et al. |
| 6,578,054 B1 | 6/2003 | Hopmann et al. |
| 6,665,731 B1 | 12/2003 | Kumar et al. |
| 6,668,376 B1 | 12/2003 | Wang et al. |
| 6,721,288 B1 | 4/2004 | King et al. |
| 6,813,670 B1 | 11/2004 | Yao et al. |
| 6,874,066 B2 | 3/2005 | Traversat et al. |
| 6,876,996 B2 | 4/2005 | Czajkowski et al. |
| 7,028,308 B2 | 4/2006 | Kim |

(Continued)

FOREIGN PATENT DOCUMENTS

| CN | 1380610 | 11/2002 |
| CN | 1906560 | 1/2007 |

(Continued)

OTHER PUBLICATIONS

Implementing a Protected Zone in a Reconfigurable Processor for Isolated Execution of Cryptographic Algorithms, Durahim et al, IEEE, 2009.*

(Continued)

*Primary Examiner* — Luu Pham
*Assistant Examiner* — Jahangir Kabir
(74) *Attorney, Agent, or Firm* — Alin Corie; Sandy Swain; Micky Minhas

(57) ABSTRACT

Implementations for providing a secure execution environment with a hosted computer are described. A security-enabled processor establishes a hardware-protected memory area with an activation state that executes only software identified by a client system. The hardware-protected memory area is inaccessible by code that executes outside the hardware-protected memory area. A certification is transmitted to the client system to indicate that the secure execution environment is established, in its activation state, with only the software identified by the request.

20 Claims, 8 Drawing Sheets

(56) References Cited

U.S. PATENT DOCUMENTS

| | | |
|---|---|---|
| 7,065,607 B2 | 6/2006 | England et al. |
| 7,185,359 B2 | 2/2007 | Schmidt et al. |
| 7,272,782 B2 | 9/2007 | Sneh |
| 7,275,105 B2 | 9/2007 | Bloch et al. |
| 7,287,259 B2 | 10/2007 | Grier et al. |
| 7,293,107 B1 | 11/2007 | Hanson et al. |
| 7,334,122 B2 | 2/2008 | Burokas et al. |
| 7,421,579 B2 | 9/2008 | England et al. |
| 7,444,337 B2 | 10/2008 | Zhou et al. |
| 7,496,495 B2 | 2/2009 | Solomon et al. |
| 7,502,823 B2 | 3/2009 | Garg et al. |
| 7,526,561 B2 | 4/2009 | Bloch et al. |
| 7,574,208 B2 | 8/2009 | Hanson et al. |
| 7,574,709 B2 | 8/2009 | Erlingsson et al. |
| 7,596,783 B2 | 9/2009 | Huang et al. |
| 7,613,862 B2 | 11/2009 | Mihai |
| 7,627,728 B1 | 12/2009 | Roeck et al. |
| 7,644,264 B1 | 1/2010 | Olsen |
| 7,676,538 B2 | 3/2010 | Potter et al. |
| 7,685,593 B2 | 3/2010 | Solomon et al. |
| 7,694,139 B2 * | 4/2010 | Nachenberg ............ G06F 21/51 713/170 |
| 7,703,081 B1 | 4/2010 | Buches |
| 7,703,083 B2 | 4/2010 | Shi et al. |
| 7,769,720 B2 | 8/2010 | Armington |
| 7,774,762 B2 | 8/2010 | Rochette et al. |
| 7,788,669 B2 | 8/2010 | England et al. |
| 7,812,985 B2 | 10/2010 | Nguyen et al. |
| 7,844,442 B2 | 11/2010 | Tzruya |
| 7,870,153 B2 | 1/2011 | Croft et al. |
| 7,882,247 B2 | 2/2011 | Sturniolo et al. |
| 7,886,183 B2 | 2/2011 | Krishnan et al. |
| 7,913,252 B2 | 3/2011 | Shlomai |
| 7,937,612 B1 | 5/2011 | Lyadvinsky et al. |
| 7,971,049 B2 | 6/2011 | TeNgaio et al. |
| 7,996,493 B2 | 8/2011 | Hill |
| 8,019,861 B2 | 9/2011 | Ginzton |
| 8,060,656 B2 | 11/2011 | Hanson et al. |
| 8,064,598 B2 * | 11/2011 | Vaha-Sipila ........ H04L 63/0823 380/247 |
| 8,074,231 B2 | 12/2011 | Hunt et al. |
| 8,117,554 B1 | 2/2012 | Grechishkin et al. |
| 8,150,971 B2 | 4/2012 | Lublin et al. |
| 8,195,774 B2 | 6/2012 | Lambeth et al. |
| 8,285,987 B1 * | 10/2012 | Kimball et al. ................ 713/164 |
| 8,332,652 B2 * | 12/2012 | Boivie .................. G06F 21/575 713/187 |
| 8,418,236 B1 | 4/2013 | Havemose |
| 8,424,082 B2 | 4/2013 | Chen et al. |
| 8,505,029 B1 | 8/2013 | Chanda et al. |
| 8,645,977 B2 | 2/2014 | Jacobson et al. |
| 8,903,705 B2 | 12/2014 | Douceur et al. |
| 8,954,752 B2 * | 2/2015 | Boivie ................ G06F 21/6209 380/201 |
| 2002/0019972 A1 | 2/2002 | Grier et al. |
| 2002/0069192 A1 | 6/2002 | Aegerter |
| 2003/0208595 A1 | 11/2003 | Gouge et al. |
| 2003/0233404 A1 | 12/2003 | Hopkins |
| 2004/0015537 A1 | 1/2004 | Doerksen et al. |
| 2004/0168030 A1 | 8/2004 | Traversat et al. |
| 2004/0172629 A1 | 9/2004 | Tene et al. |
| 2004/0177243 A1 | 9/2004 | Worley, Jr. |
| 2005/0033980 A1 | 2/2005 | Willman et al. |
| 2005/0044534 A1 | 2/2005 | Darweesh et al. |
| 2005/0060722 A1 | 3/2005 | Rochette et al. |
| 2005/0076186 A1 | 4/2005 | Traut |
| 2005/0080936 A1 | 4/2005 | Ray et al. |
| 2005/0091226 A1 | 4/2005 | Lin et al. |
| 2005/0102370 A1 | 5/2005 | Lin et al. |
| 2005/0108171 A1 | 5/2005 | Bajikar et al. |
| 2005/0177635 A1 | 8/2005 | Schmidt et al. |
| 2005/0187894 A1 | 8/2005 | Pletcher et al. |
| 2005/0198379 A1 | 9/2005 | Panasyuk et al. |
| 2005/0203962 A1 | 9/2005 | Zhou et al. |
| 2005/0240985 A1 | 10/2005 | Alkove et al. |
| 2006/0004927 A1 | 1/2006 | Rehman et al. |
| 2006/0005047 A1 | 1/2006 | Lekatsas et al. |
| 2006/0037072 A1 | 2/2006 | Rao et al. |
| 2006/0156418 A1 | 7/2006 | Polozoff |
| 2006/0161563 A1 | 7/2006 | Besbris et al. |
| 2006/0161982 A1 | 7/2006 | Chari et al. |
| 2006/0184931 A1 | 8/2006 | Rochette et al. |
| 2006/0248208 A1 | 11/2006 | Walbeck et al. |
| 2006/0259734 A1 | 11/2006 | Sheu et al. |
| 2006/0294518 A1 | 12/2006 | Richmond et al. |
| 2007/0061556 A1 | 3/2007 | Rothman et al. |
| 2007/0074191 A1 | 3/2007 | Geisinger |
| 2007/0078950 A1 | 4/2007 | Hopkins et al. |
| 2007/0134068 A1 | 6/2007 | Smith et al. |
| 2007/0136579 A1 | 6/2007 | Levy et al. |
| 2007/0136723 A1 | 6/2007 | Smith et al. |
| 2007/0169116 A1 | 7/2007 | Gujarathi et al. |
| 2007/0174910 A1 | 7/2007 | Zachman et al. |
| 2007/0198657 A1 | 8/2007 | Saliba et al. |
| 2007/0244980 A1 | 10/2007 | Baker, III et al. |
| 2007/0250838 A1 | 10/2007 | Belady et al. |
| 2007/0283324 A1 | 12/2007 | Geisinger |
| 2007/0288228 A1 | 12/2007 | Taillefer et al. |
| 2008/0005472 A1 | 1/2008 | Khalidi et al. |
| 2008/0005794 A1 | 1/2008 | Inoue et al. |
| 2008/0016339 A1 | 1/2008 | Shukla |
| 2008/0028401 A1 | 1/2008 | Geisinger |
| 2008/0127182 A1 | 5/2008 | Newport et al. |
| 2008/0127225 A1 | 5/2008 | Mullis et al. |
| 2008/0127348 A1 | 5/2008 | Largman et al. |
| 2008/0222160 A1 | 9/2008 | MacDonald et al. |
| 2008/0222628 A1 | 9/2008 | Batra et al. |
| 2008/0263531 A1 | 10/2008 | Perry et al. |
| 2008/0276012 A1 | 11/2008 | Mesa et al. |
| 2009/0024757 A1 | 1/2009 | Proctor |
| 2009/0064196 A1 | 3/2009 | Richardson et al. |
| 2009/0094337 A1 | 4/2009 | Dias |
| 2009/0204960 A1 | 8/2009 | Ben-Yehuda et al. |
| 2009/0204961 A1 | 8/2009 | DeHaan et al. |
| 2009/0210871 A1 | 8/2009 | Dechovich |
| 2009/0217047 A1 | 8/2009 | Akashika et al. |
| 2009/0222304 A1 | 9/2009 | Higgins et al. |
| 2009/0249051 A1 | 10/2009 | Tengaio et al. |
| 2009/0259993 A1 | 10/2009 | Konduri et al. |
| 2009/0265706 A1 | 10/2009 | Golosovker et al. |
| 2009/0282266 A1 | 11/2009 | Fries et al. |
| 2009/0282404 A1 | 11/2009 | Khandekar et al. |
| 2009/0282474 A1 | 11/2009 | Chen et al. |
| 2009/0307781 A1 | 12/2009 | Iga et al. |
| 2009/0328225 A1 | 12/2009 | Chambers et al. |
| 2010/0017461 A1 | 1/2010 | Kokkevis et al. |
| 2010/0017857 A1 | 1/2010 | Kramer |
| 2010/0023700 A1 | 1/2010 | Chen et al. |
| 2010/0031276 A1 | 2/2010 | Hsieh |
| 2010/0042636 A1 | 2/2010 | Lu |
| 2010/0042796 A1 | 2/2010 | Vasilevsky et al. |
| 2010/0042987 A1 | 2/2010 | Yamada |
| 2010/0082926 A1 | 4/2010 | Sahita et al. |
| 2010/0083015 A1 | 4/2010 | Yokota et al. |
| 2010/0115334 A1 | 5/2010 | Malleck et al. |
| 2010/0153659 A1 | 6/2010 | Lovell et al. |
| 2010/0158220 A1 | 6/2010 | Silverman |
| 2010/0169407 A1 | 7/2010 | Hsueh et al. |
| 2010/0169497 A1 | 7/2010 | Klimentiev et al. |
| 2010/0174833 A1 | 7/2010 | Filer et al. |
| 2010/0180275 A1 | 7/2010 | Neogi et al. |
| 2010/0185956 A1 | 7/2010 | Anantharaman et al. |
| 2010/0211663 A1 | 8/2010 | Barboy et al. |
| 2010/0211956 A1 | 8/2010 | Gopisetty et al. |
| 2010/0217853 A1 | 8/2010 | Alexander et al. |
| 2010/0262853 A1 | 10/2010 | Goda |
| 2010/0262977 A1 | 10/2010 | Havemose |
| 2010/0287263 A1 | 11/2010 | Liu et al. |
| 2010/0287548 A1 | 11/2010 | Zhou et al. |
| 2010/0287618 A1 | 11/2010 | Howell et al. |
| 2010/0293392 A1 | 11/2010 | Miyamoto |
| 2010/0306848 A1 | 12/2010 | Gellerich |
| 2010/0332629 A1 | 12/2010 | Cotugno et al. |
| 2011/0004878 A1 | 1/2011 | Divoux |

(56) References Cited

U.S. PATENT DOCUMENTS

| | | | |
|---|---|---|---|
| 2011/0047376 A1 | 2/2011 | Mittal | |
| 2011/0119494 A1 | 5/2011 | Huang et al. | |
| 2011/0162082 A1 | 6/2011 | Paksoy et al. | |
| 2011/0191494 A1 | 8/2011 | Turanyi et al. | |
| 2011/0191788 A1 | 8/2011 | Jacobson et al. | |
| 2011/0202739 A1 | 8/2011 | Grisenthwaite | |
| 2011/0231670 A1 | 9/2011 | Shevchenko et al. | |
| 2011/0246551 A1 | 10/2011 | Giancaspro et al. | |
| 2011/0257992 A1 | 10/2011 | Scantland et al. | |
| 2011/0264788 A1 | 10/2011 | Costa | |
| 2011/0276806 A1 | 11/2011 | Casper et al. | |
| 2011/0277013 A1 | 11/2011 | Chinta | |
| 2011/0296487 A1 | 12/2011 | Walsh | |
| 2011/0302330 A1 | 12/2011 | Cota-Robles et al. | |
| 2011/0302415 A1 | 12/2011 | Ahmad et al. | |
| 2011/0320520 A1 | 12/2011 | Jain | |
| 2011/0320812 A1* | 12/2011 | Kuno | G06F 12/1458 713/168 |
| 2012/0005192 A1 | 1/2012 | Bao et al. | |
| 2012/0017213 A1 | 1/2012 | Hunt et al. | |
| 2012/0036255 A1 | 2/2012 | Polsky | |
| 2012/0036509 A1 | 2/2012 | Srinivasan et al. | |
| 2012/0084562 A1 | 4/2012 | Farina et al. | |
| 2012/0144042 A1 | 6/2012 | Lublin et al. | |
| 2012/0159184 A1 | 6/2012 | Johnson et al. | |
| 2012/0179485 A1 | 7/2012 | Saneii | |
| 2012/0203932 A1 | 8/2012 | da Costa et al. | |
| 2012/0222025 A1 | 8/2012 | Pandit | |
| 2012/0227038 A1 | 9/2012 | Hunt et al. | |
| 2012/0227058 A1 | 9/2012 | Hunt et al. | |
| 2012/0227061 A1 | 9/2012 | Hunt et al. | |
| 2012/0265742 A1 | 10/2012 | Burckhardt et al. | |
| 2012/0266167 A1 | 10/2012 | Spiers et al. | |
| 2012/0291094 A9* | 11/2012 | Forrester et al. | 726/3 |
| 2012/0296626 A1 | 11/2012 | Bond et al. | |
| 2012/0297249 A1 | 11/2012 | Yang et al. | |
| 2013/0031371 A1* | 1/2013 | McLellan et al. | 713/182 |
| 2013/0036431 A1 | 2/2013 | Douceur et al. | |
| 2013/0054734 A1 | 2/2013 | Bond et al. | |
| 2013/0060947 A1 | 3/2013 | Nelson | |
| 2013/0151846 A1 | 6/2013 | Baumann et al. | |
| 2013/0151848 A1 | 6/2013 | Baumann et al. | |
| 2013/0152209 A1 | 6/2013 | Baumann et al. | |
| 2013/0232345 A1 | 9/2013 | Johnson et al. | |
| 2013/0254884 A1 | 9/2013 | Dalcher et al. | |
| 2013/0333005 A1 | 12/2013 | Kim et al. | |
| 2016/0026488 A1 | 1/2016 | Bond et al. | |

FOREIGN PATENT DOCUMENTS

| | | |
|---|---|---|
| CN | 101174293 | 5/2008 |
| CN | 101448255 | 6/2009 |
| CN | 101632083 | 1/2010 |
| CN | 101655798 A | 2/2010 |
| CN | 102077209 | 5/2011 |
| EP | 1526425 | 4/2005 |
| WO | WO2008111049 A2 | 9/2008 |
| WO | WO2011027191 | 3/2011 |
| WO | WO2011027191 A | 3/2011 |

OTHER PUBLICATIONS

Energy and Execution Time Analysis of a Software-based Trusted Platform Module, Aaraj et al, IEEE 2007.*

"Amazon Elastic Compute Cloud (EC2)", maluke.com, accessible from http://www.maluke.com/blog/amazon-elastic-compute-cloud-ec2, obtained on Dec. 5, 2011, 2 pages.

Ammons et al., "Libra: A Library OS for a JVM in a Virtualized Execution Environment", In Proceedings of the 3rd International Conference on Virtual Execution Environments, Jun. 13-15, 2007, 11 pages.

Anderson, "The Case for Application-specific Operating Systems", In Proceedings of the 3rd Workshop on Workstation Operating Systems, Apr. 23-24, 1992, 3 pages.

Appavoo et al., "Providing a Linux API on the Scalable K42 Kernel", In Proceedings of the 2003 USENIX Annual Technical Conference, Jun. 9-14, 2003, 14 pages.

"Aquifer Application Services Platform Version 5.5", retrieved on Mar. 3, 2009 at <<http://www.sysmanagement.com/enterpriseProducts/overview.aspx>>, Systems Management Engineering 2003, 2 pages.

Azab et al., "SICE: A Hardware-Level Strongly Isolated Computing Environment for x86 Multi-core Platforms", CCS11, Oct. 17-21, 2011, Chicago, Illinois, 14 pages.

Barham et al., "Xen and the Art of Virtualization", In Proceedings of the 19th ACM Symposium on Operating Systems Principles, Oct. 19-22, 2003, 14 pages.

Baumann et al., "The Multikernel: A New OS Architecture for Scalable Multicore Systems", In Proceedings of the 22nd ACM Symposium on Operating Systems Principles, Oct. 11-14, 2009, 15 pages.

Bershad et al., "Extensibility, Safety and Performance in the SPIN Operating System", Proceedings of the fifteenth ACM symposium on Operating systems principles, Published Date: Dec. 3, 1995, 17 pages.

Bhattiprolu et al., "Virtual Servers and Checkpoint/Restart in Mainstream Linux", SIGOPS Operating Systems Review, Jul. 2008, 10 pages.

"Browser Swallows OS", retrieved on Mar. 3, 2009 at <<http://www.desktoplinux.com/news/NS2750645189.html>>, Ziff Davis Enterprise Holdings Inc., Dec. 1, 2008, 3 pages.

Bugnion et al., "Disco: Running Commodity Operating Systems on Scalable Multiprocessors", ACM Transactions on Computer Systems, vol. 15, No. 4, Nov. 1997, 36 pages.

Celesti et al., "Improving Virtual Machine Migration in Federated Cloud Environments", Second International Conference on Evolving Internet, Published date: Sep. 20-25, 2010, 7 pages.

Chahal et al., "Testing Live Migration with Intel Virtualization Technology FlexMigration", Intel Information Technology, Jan. 2009, 12 pages.

Chang et al., "User-level Resource-constrained Sandboxing", USENIX-NT, Aug. 2000, 11 pages.

Chen et al., "Setuid Demystified", In Proceedings of the 11 th USENIX Security Symposium, Aug. 5-9, 2002, 20 pages.

Chen, "Native Client: A Technology for Running Native Code on the Web", retrieved on Mar. 3, 2009 at <<http://google-code-updates.blogspot.com/2008/12/native-client-technology-for-running.html>>, Google Code Blog, Dec. 8, 2008, 21 pages.

Cheriton et al., "A Caching Model of Operating System Kernel Functionality", In Proceedings of the 1st USENIX Symposium on Operating Systems Design and Implementation, Nov. 1994, 15 pages.

Chernoff, et al., "DIGITAL FX!32 Running 32-Bit x86 Applications on Alpha NT", retrieved on Mar. 3, 2009 at <<http://citeseerx.ist.psu.edu/viewdoc/summary?doi=10.1.1.21.8607>>, Proceedings of the USENIX Windows NT Workshop, Seattle, WA., Aug. 1997, 8 pages.

Chiueh, et al., "Integrating Segmentation and Paging Protection for Safe, Efficient and Transparents Software Extensions", retrieved on Mar. 3, 2009 at <<http://www.sigops.org/sosp99/slides/kernel/chiueh.ps>>, Computer Science Dept., State University of New York, NY., 22 pages.

Christodorescu et al., "Cloud Security is Not (Just) Virtualization Security", CCSW09, Nov. 13, 2009, Chicago, Illinois, 6 pages.

Clark, et al., "Live Migration of Virtual Machines", retrieved on Mar. 3, 2009 at <<http://www.cl.cam.ac.uk/research/srg/netos/papers/2005-migration-nsdi-pre.pdf>>, 14 pages.

"CLOC Count Lines of Code", retrieved on Mar. 3, 2009 at <<http://cloc.sourceforge.net/>>, Northrop Grummam Corporation / Information Technology / IT Solutions, 2006-2009, 15 pages.

Yee et al., "Native Client: A Sandbox for Portable, Untrusted x86 Native Code", In Proceedings of the 30th IEEE Symposium on Security and Privacy, May 17-20, 2009, 15 pages.

Cox, et al., "A Safety-Oriented Platform for Web Applications", retrieved on Mar. 3, 2009 at <<http://www.cs.washington.edu/homes/gribble/papers/gribble-Tahoma.pdf>>, 15 pages.

"CVE-2003-0111", retrieved on Mar. 3, 2009 at <<http://cve.mitre.org/cgi-bin/cvename.cgi?name=CAN-2003-0111>>, Common Vulnerabilities and Exposures website, 2009, 1 page.

(56) References Cited

OTHER PUBLICATIONS

"CVE-2007-0043", retrieved on Mar. 3, 2009 at <<http://cve.mitre.org/cgi-bin/cvename.cgi?name=CVE-2007-0043>>, Common Vulnerabilities and Exposures website, 2009, 1 page.

"Debian Counting", retrieved on Mar. 3, 2009 at <<http://libresoft.dat.escet.urjc.es/debian-counting/>>, Grupo de Sistemas y Comunicaciones, Universidad Rey Juan Carlos, Mostoles, Madrid, Spain, 2004-2005, 1 page.

Microsoft—TechNet, Device Management and Installation Step-by-Step Guide, retrieved on Apr. 14, 2011 at <<http://technet.microsoft.com/en-us/library/dd919230%28W5.10%29.aspx>>, 2 pages.

Douceur et al., "Leveraging Legacy Code to Deploy Desktop Applications on the Web", In Proceedings of the 8th USENIX Symposium on Operating Systems Design and Implementation, Dec. 2008, 16 pages.

Douceur, et al., "Leveraging Legacy Code to Deploy Desktop Applications on the Web", retrieved on Mar. 3, 2009 at <<http://www.usenix.org/events/osdi08/tech/full_papers/douceur/douceur_html/index.html>>, Microsoft Research, pp. 1-21.

Douceur, et al., "Leveraging Legacy Code to Deploy Desktop Applications on the Web", retrieved on Oct. 11, 2010 at <<http://research.microsoft.com/pubs/72878/xax-osdi08.pdf>>, USENIX Association, Proceedings of Conference on Operating Systems Design and Implementation, San Diego, California, 2008, pp. 339-354.

Eiraku et al., "Fast Networking with Socket Outsourcing in Hosted Virtual Machine Environments", In Proceedings of the 24th ACM Symposium on Applied Computing, Mar. 8-12, 2009, 8 pages.

Engler et al., "Exokernel: An Operating System Architecture for Application-level Resource Management", In Proceedings of the 15th ACM Symposium on Operating Systems Principles, Dec. 3-6, 1995, 16 pages.

Erlingsson, et al., "XFI: Software Guards for System Address Spaces", retrieved on Mar. 3, 2009 at <<http://www.cs.ucsd.edu/~myrable/papers/2006-osdi-xfi.pdf>>, Microsoft Research, Silicon Valley, pp. 1-14.

Ford, et al., "Vx32: Lightweight, User-level Sandboxing on the x86", retrieved on Mar. 4, 2009 at <<http://pdos.csail.mit.edu/papers/vx32:usenix08/>>, Massachusetts Institute of Technology, 20 pages.

Ford, et al., "VXA: A Virtual Architecture for Durable Compressed Archives", retrieved on Mar. 3, 2009 at <<http://pdos.csail.mit.edu/papers/vxa:fast05.pdf>>, Computer Science and Artificial Intelligence Laboratory, MIT, Mass., 14 pages.

Franke et al., "Fuss, Futexes and Furwocks: Fast Userlevel Locking in Linux", In Proceedings of the Ottawa Linux Symposium, Jul. 11-14, 2010, 19 pages.

Garfinkel et al., "Flexible OS Support and Applications for Trusted Computing", Proceedings of the 9th conference on Hot Topics in Operating Systems, May 2003, 6 pages.

Garfinkel et al., "Terra: A Virtual Machine-Based Platform for Trusted Computing", Proceedings of the nineteenth ACM symposium on Operating systems principles, Published Date: Oct. 22, 2003, 14 pages.

Garfinkel, "Traps and Pitfalls: Practical Problems in System Call Interposition Based Security Tools", In Proceedings of the Network and Distributed Systems Security Symposium, Feb. 6-7, 2003, 14 pages.

Garfinkel, et al., "Ostia: A Delegating Architecture for Secure System Call Interposition", retrieved on Mar. 3, 2009 at <<http://www.isoc.org/isoc/conferences/ndss/04/proceedings/Papers/Garfinkel.pdf>>, Computer Science Department, Stanford University, CA., 15 pages.

Garfinkel, "Traps and Pitfalls: Practical Problems in System Call Interposition Based Security Tools", retrieved on Mar. 3, 2009 at <<http://www.stanford.edu/~talg/papers/traps/traps-ndss03.pdf>>, Computer Science Department, Stanford University, 14 pages.

Goldberg, et al., "A Secure Environment for Untrusted Helper Applications (Confining the Wily Hacker)", retrieved on Mar. 3, 2009 at <<http://www.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.

"Gears Improving Your Web Browser", retrieved on Mar. 3, 2009 at << http://gears.google.com/>>, Google, 1 page.

Gupta et al., "Difference Engine: Harnessing Memory Redundancy in Virtual Machines", In Proceedings of the 8th USENIX Symposium on Operating Systems Design and Implementation, Dec. 8-10, 2008, 14 pages.

Haff, "RingCube brings 'containers' to the client", retrieved on Oct. 11, 2010 at <<http://news.cnet.com/8301-13556_3-10158247-61.html>>, CNET News, Feb. 6, 2009, pp. 1-3.

Harren, et al., "Using Dependent Types to Certify the Safety of Assembly Code", retrieved on Mar. 3, 2009 at <<http://www.cs.berkeley.edu/~necula/Papers/deptypes_sas05.pdf>>, Static Analysis Symposium (SAS) 2005, pp. 155-170.

Helander, "Unix Under Mach: The Lites Server", Helsinki University of Technology, Helsinki, Dec. 30, 1994, 71 pages.

Howell et al., "Living Dangerously: A Survey of Software Download Practices", Microsoft Research, May 2010, 16 pages.

"iKernel: Isolating Buggy and Malicious Device Drivers Using Hardware Virtualization Support", SlideShare, Inc., retrieved on Aug. 4, 2011 at <<http://www.slideshare.net/Cameroon45/ikernel-isolating-buggy-and-malicious-device-drivers-using>>, 7 pages.

Intel Cloud Builder Guide, "Intel Cloud Builders Guide to Cloud Design and Deployment on Intel Platforms", www.intel.com/en_US/Assets/PDF/general/icb_ra_cloud_computing_Parallels_TCP.pdf, Retrieved Date: Dec. 7, 2011, 19 pages.

Jackson, et al., "Protecting Browser State from Web Privacy Attacks", retrieved on Mar. 3, 2009 at <<http://portal.acm.org/citation.cfm?id=1135884>>, WWW 2006, May 23-26, 2006, Edinburgh, Scotland, pp. 737-744.

Jobs, "Keynote Address", Apple Worldwide Developers Conference, Aug. 2006, 3 pages.

Kiciman, et al., "AjaxScope: A Platform for Remotely Monitoring the Client-Side Behavior of Web 2.0 Applications", retrieved on Mar. 3, 2009 at <<http://research.microsoft.com/en-us/projects/ajaxview/ajaxscope-sosp.pdf>>, SOSP 2007, Oct. 14-17, 2007, Stevenson, WA., 14 pages.

Ko et al., "TrustCloud: A Framework for Accountability and Trust in Cloud Computing", Published Jul. 8, 2011, 5 pages.

Kozuch, et al., "Internet Suspend/Resume", retrieved on Mar. 3, 2009 at <<http://www.intel-research.net/Publications/Pittsburgh/110620030912_88.pdf>>, Fourth IEEE Workshop on Mobile Computing Systems and Applications, Callicoon, NY, Apr. 2002, 8 pages.

Leslie et al, "The Design and Implementation of an Operating System to Support Distributed Multimedia Applications", IEEE Journal on Selected Areas in Communications, May 1996, 18 pages.

Litzkow et al., "Checkpoint and Migration of UNIX Processes in the Condor Distributed Processing System", University of Wisconsin Madison, Apr. 1997, 9 pages.

"Live from CES: Hands on With Vista—Vista by the Numbers, A Developer Tells All", retrieved on Mar. 3, 2009 at <<http://ces.gearlive.com/cesblog/article/live-from-ces-hands-on-with-vistamdashvista-by-the-numbers-0108051321/>>, 5 pages.

Livshits, et al., "Doloto: Code Splitting for Network-Bound Web 2.0 Applications", retrieved on Mar. 3, 2009 at <<ftp://ftp.research.microsoft.com/pub/tr/TR-2007-159.pdf>>, Microsoft Research, pp. 1-25.

Lorch, et al., "The VTrace Tool: Building a System Tracer for Windows NT and Windows 2000", retrieved on Mar. 4, 2009 at <<http://msdn.microsoft.com/en-us/magazine/cc302289(printer).aspx>>, Microsoft Corporation 2009, 10 pages.

Loscocco et al., "Integrating Flexible Support for Security Policies into the Linux Operating System", In Proceedings of the 2001 USENIX Annual Technical Conference, Feb. 2001, 62 pages.

Love, "Get on the D-BUS", Linux Journal, accesible from http://www.ee.ryerson.ca/~courses/coe518/LinuxJournal/elj2005-130-D-BUS.pdf, obtained on Jun. 18, 2006, 5 pages.

OSdata.com, "Maintenance and Administration," retrieved on Apr. 14, 2011 at <<http://www.osdata.com/holistic/maintain/maintain.htm>>, 8 pages.

Malan et al., "DOS as a Mach 3.0 Application", In Proceedings of the USENIX Mach Symposium, Nov. 1991, 14 pages.

(56) References Cited

OTHER PUBLICATIONS

Marosi et al., "Using VirtualMachines in Desktop Grid Clients for Application Sandboxing", CoreGRID Technical Report, No. TR-140, Aug. 31, 2008, 13 pages.
McCamant, et al., "Evaluating SFI for a CISC Architecture", retrieved on Mar. 3, 2009 at <<http://groups.csail.mit.edu/pag/pubs/pittsfield-usenix2006.pdf>>, pp. 1-16.
McIlroy, "Mass Produced Software Components", retrieved on Mar. 3, 2009 at <<http://www.dcs.gla.ac.uk/courses/teaching/mscweb/rrcs/papers/SE/McIlroy.pdf >>, 12 pages.
Microsoft, "Microsoft Application Virtualization (App-V)", accessible from http://www.microsoft.com/en-us/windows/enterprise/products-and-technologies/virtualization/app-v.aspx, obtained on Dec. 7, 2011, 2 pages.
Microsoft, "Performance Tuning Guidelines for Windows Server 2008 R2", Redmond, WA, May 16, 2011, 118 pages.
Microsoft, "Remote Desktop Protocol: Basic Connectivity and Graphics Remoting Specification", Redmond, WA, release: Sep. 20, 2011, 417 pages.
Mihocka et al., "Virtualization without direct execution or jitting: designing a portable virtual machine infrastructure", retrieved at bochs.sourceforge.net/Virtualization_Without_Hardware_Final.PDF, Jun. 21, 2008, 16 pages.
Morrisett, et al., "From System F to Typed Assembly Language", retrieved on Mar. 3, 2009 at <<http://www.cs.princeton.edu/~dpw/papers/tal-toplas.pdf>>, Mar. 1999, pp. 1-41.
"Mozilla: The browser as operating system", retrieved on Mar. 3, 209 at <<http://www.mathewingram.com/work/2008/08/26/mozilla-the-browser-as-operating-system/>>, Aug. 26, 2008, 8 pages.
Necula, et al., "CCured: Type-Safe Retrofitting of Legacy Software", retrieved on Mar. 3, 2009 at <<http://www.eecs.berkeley.edu/~necula/Papers/ccured_toplas.pdf>>, ACM Transactions on Programming Languages and Systems, vol. 27, No. 3, May 2005, 48 pages.
Necula, et al., "Safe Kernel Extensions Without Run-Time Checking", retrieved on Mar. 3, 2009 at <<http://citeseerx.ist.psu.edu/viewdoc/summary?doi=10.1.1.40.3010>>, Proceedings of the Second Symposium on Operating Systems Design and Implementation (OSDI 1996), Seattle, WA., Oct. 28-31, 1996, 15 pages.
"CWE-Common Weakness Enumeration", retrieved on Mar. 3, 2009 at <<http://nvd.nist.gov/cwe.cfm>>, National Vulnerability Database, NIST, 3 pages.
Office action for U.S. Appl. No. 12/463,892, mailed on Jun. 14, 2012, Howell et al., "Executing Native-Code Applications in a Browser", 15 pages.
Office Action for U.S. Appl. No. 12/463,892, mailed on Dec. 6, 2011, Jonathan R. Howell, "Executing Native-Code Applications in a Browser", 21 pgs.
"Outsource Web Enabling your Legacy Applications to O2I", retrieved on Mar. 3, 2009 at <<http://www.outsource2india.com/software/LegacySystems.asp>>, Flatworld Solutions Company, 2008, 7 pages.
Piotrowski, et al., "Virtics: A System for Privilege Separation of Legacy Desktop Applications", retrieved on Oct. 11, 2010 at <<http://www.eecs.berkeley.edu/Pubs/TechRpts/2010/EECS-2010-70.pdf>>, EECS Department, University of California at Berkeley, Technical Report No. UCB/EECS-2010-70, May 13 2010, pp. 1-21.
Porter et al., "Rethinking the Library OS from the Top Down", ASPLOS' 11, Mar. 5-11, 2011, Newport Beach, California, 15 pages.
Price et al., "Solaris Zones: Operating System Support for Server Consolidation", In Proceedings of the Large Installation Systems Administration Conference, Nov. 2004, 2 pages.
Provos, "Improving Host Security with System Call Policies", retrieved on Mar. 3, 2009 at <<http://www.citi.umich.edu/u/provos/papers/systrace.pdf>>, Center for Information Technology Integration, University of Michigan, 15 pages.
Puder, "Extending Desktop Applications to the Web", retrieved on Mar. 3, 2009 at <<http://www.puder.org/publications/dorea04.pdf>>, San Francisco State University, Computer Science Department, 6 pages.

Purdy, et al., "Google Chrome as Future Operating System", retrieved on Mar. 3, 2009 at <<http://lifehacker.com/5053069/google-chrome-as-future-operating-system>>, Sep. 22, 2008, 1 page.
Resig, "The Browser Operating System", retrieved on Mar. 3, 2009 at <<http://ejohn.org/blog/the-browser-operating-system/>>, Feb. 22, 2009, 5 pages.
Rinard, et al., "Enhancing Server Availability and Security Through Failure-Oblivious Computing", retrieved on Mar. 3, 2009 at <<http://web.mit.edu/droy/www/papers/osdi04.pdf>>, Computer Science and Artificial Intelligence Laboratory, MIT, Mass., 14 pages.
Roscoe et al., "Hype and Virtue", In Proceedings of the 11th USENIX Workshop on Hot Topics in Operating Systems, Aug. 2007, 6 pages.
Sabin, "Strace for NT", retrieved on Mar. 3, 2009 at <<http://www.securityfocus.com/tools/1276>>, SecurityFocus 2007, 1 page.
Sapuntzakis et al., "Virtual Appliances for Deploying and Maintaining Software", In Proceedings of the Large Installation Systems Administration Conference, Oct. 2003, 15 pages.
Sapuntzakis, et al., "Optimizing the Migration of Virtual Computers", retrieved on Mar. 3, 2009 at <<http://suif.stanford.edu/collective/osdi02-optimize-migrate-computer.pdf>>, Computer Science Department, Stanford University, 14 pages.
"Secunia Advisories: SA7587", retrieved on Mar. 3, 2009 at <<http://secunia.com/advisories/7587/>>, Secunia 2002-2009, 4 pages.
Smith, Roderick W., "Using QEMU for cross-platform development", retrieved at www.ibm.com/developerworks/linux/library/l-qemu-development/?ca=drs-, Feb. 9, 2010, 7 pages.
Soltesz et al., "Container-based Operating System Virtualization: A Scalable, High-performance Alternative to Hypervisors", In Proceedings of the 2nd ACM SIGOPS/EuroSys European Conference on Computer Systems, Mar. 21-23, 2007, 13 pages.
"Open Source Software", retrieved on Mar. 3, 2009 at <<http://sourceforge.net>>, SourceForge, Inc., 1999-2009, 1 page.
Spear et al., "Solving the Starting Problem: Device Drivers as Self-describing Artifacts", In Proceedings of the EuroSys 2006 Conference, Apr. 18-21, 2006, 13 pages.
Stokely, "The FreeBSD Handbook", 3rd Edition, vol. 1: User's Guide, FreeBSD Mall, Inc., Brentwood, CA., 2003, 408 pgs.
Sugerman et al., "Virtualizing I/O Devices on VMware Workstation's Hosted Virtual Machine Monitor", In Proceedings of the 2001 USENIX Annual Technical Conference, Jun. 25-30, 2001, 15 pages.
"Sun Ray Ultra-Thin Clients in Technical Computing", retrieved on Oct. 11, 2010 at <<http://www.sun-rays.org/lib/hardware/sunray/ds/sunray_tc.pdf>>, Sun Microsystems, Inc., Datasheet, 2003, pp. 1-2.
Swift, et al., "Improving the Reliability of Commodity Operating Systems", retrieved on Mar. 3, 2009 at <<http://nooks.cs.washington.edu/nooks-tocs.pdf>>, University of Washington, pp. 1-33.
Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.
Szefer et al., "Eliminating the Hypervisor Attack Surface for a More Secure Cloud", published Oct. 17-21, 2011, CCS11, 12 pages.
Ta-Min et al., "Splitting Interfaces: Making Trust between Applications and Operating Systems Configurable", Proceedings of the 7th symposium on Operating systems design and implementation, Published Date: Nov. 2006, 14 pages.
"The Dojo Offline Toolkit", retrieved on Mar. 4, 2009 at <<http://dojotoolkit.org/offline>>, The Dojo Foundation, 3 pages.
Tridgell, "Efficient Algorithms for Sorting and Synchronization", retrieved on Mar. 3, 2009 at <<http://www.samba.org/~tridge/phd_thesis.pdf>>, Australian National University, Feb. 1999, 115 pages.
Tucker, et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
"User-Mode Driver Framework (UMDF)", Microsoft Windows, retrieved on Aug. 4, 2011 at <<http://msdn.microsoft.com/en-us/windows/hardware/gg463294.aspx>>, 1 page.
VMWare ThinApp, "Application Virtualization Made Simple", accessible from http://www.vmware.com/products/thinapp/overview.html, data sheet obtained on Aug. 29, 2012, 2 pages.

(56) References Cited

OTHER PUBLICATIONS

Wahbe, et al., "Efficient Software-Based Fault Isolation", retrieved on Mar. 3, 2009 at <<http://crypto.stanford.edu/cs155/papers/sfi.pdf>>, SIGOPS 1993/12/93/N.C., USA, pp. 203-216.
Zeldovich et al., "Making Information Flow Explicit in Histar", In Proceedings of the 8th USENIX Symposium on Operating Systems Design and Implementation, Nov. 2006, 16 pages.
Waldspurger, "Memory Resource Management in VMware ESX Server", retrieved on Mar. 3, 2009 at <<http://www.waldspurger.org/carl/papers/esx-mem-osdi02.pdf>>, Proc. Fifth Symposium on Operating Systems Design and Implementation (OSDI 2002), Dec. 2002, pp. 1-14.
"What is JPC?", retrieved on Mar. 4, 2009 at <<http://www-jpc.physics.ox.ac.uk/>>, Oxford University, 2004-2007, 2 pages.
Whitaker et al., "Scale and Performance in the Denali Isolation Kernel", In Proceedings of the 5th USENIX Symposium on Operation Systems Design and Implementation, Dec. 9-11, 2002, 15 pages.
Whitaker, et al., "Denali: Lightweight Virtual Machines for Distributed and Networked Applications", retrieved on Mar. 3, 2009 at <<http://denali.cs.washington.edu/pubs/distpubs/papers/danali_usenix2002.pdf>>, University of Washington, 14 pages.
"Windows Driver Kit", retrieved on Mar. 3, 2009 at <<http://microsoft.com/whdc/devtools/wdk/default.mspx>>, Microsoft Corporation 2009, 2 pages.
"Windows User Mode Driver Framework", From Wikipedia, the free encyclopedia, Retrieved on Aug. 4, 2011 at <<http://en.wikipedia.org/wiki/User-Mode_Driver_Framework>>, 2 pages.
"WineHQ", retrieved on Mar. 3, 2009 at <<http://www.winehq.org/>>, 3 pages.
Witchel, et al., "Mondrix: Memory Isolation for Linux using Mondriaan Memory Protection", retrieved on Mar. 3, 2009 at <<http://www.cag.lcs.mit.edu/scale/papers/mmp-sosp2005.pdf>>, SOSP 2005, Oct. 23-26, 2005, Brighton, UK, 14 pages.
Wood, et al., "CloudNet: Dynamic Pooling of Cloud Resources by Live WAN Migration of Virtual Machines", VEE'11, Mar. 9-11, 2011, Newport Beach, California, 12 pages.
Zhang, et al., "A CORBA Trader-based Dynamic Binding Infrastructure in Pervasive Computing", retrieved on Oct. 11, 2010 at <<http://ieeexplore.ieee.org/stamp/stamp.jsp?tp=arnumber=4079032>>, International Symposium on Pervasive Computing and Applications, 2006, pp. 12-16.
LeVasseur et al., "Pre-Virtualization: Slashing the Cost of Virtualization", University of Karlsruhe, Germany, IBM, T. J. Watson Research Center, New York National ICT, Australia University of New South Wales, Australia, Nov. 2005, 14 pages.
Office action for U.S. Appl. No. 13/372,390, mailed on Mar. 12, 2013, Baumann et al., "Cryptographic Certification of Secure Hosted Execution Environments", 16 pages.
Office action for U.S. Appl. No. 12/972,081, mailed on Apr. 5, 2013, Douceur et al., "Application Compatibility Shims for Minimal Client Computers", 13 pages.
Office action for U.S. Appl. No. 13/196,235, mailed on Apr. 8, 2013, Douceur et al., "Constraining Execution of Specified Device Drivers ", 24 pages.
Office action for U.S. Appl. No. 13/323,562, mailed on May 8, 2013, Baumann et al., "Facilitating System Service Request Interactions for Hardware-Protected Applications", 12 pages.
Vaarala, S., "Security Considerations of Commodity x86 Virtualization", Helsinki University of Technology, Telecommunications Software and Multimedia Laboratory, May 22, 2006, 150 pages.
Wang et al., "Protection and Communication Abstractions for Web Browsers in MashupOS", SOS, Oct. 2007, 15 pages.
Allen, "Windows Vista Application Development Requirements for User Account Control Compatibility", retrieved from <<http://msdn.microsoft.com/en-us/library/bb530410.aspx>>, Jun. 2007, 59 pages.
Charles, "Mark Russinovich: Inside Windows 7", retrieved at <<http://channel9.msdn.com/Shows/Going+Deep/Mark-Russinovich-Inside-Windows-7>>, Jan. 2009, 12 pages.
"Escaping from Microsoft's Protected Mode Internet Explorer—Evaluating a potential security boundary", retrieved at <<http://www.verizonbusiness.com/resources/whitepapers/wp_escapingmicrosoftprotectedmodeinternetexplorer_en_xg.pdf>>, White Paper, 2010, 8 pages.
Fischer, "Red Hat Enterprise Linux 4 Application Compatibility", retrieved from <<http://www.redhat.com/f/pdf/rhel4/AppCompat.pdf>>, Feb. 2005, 12 pages.
International Search Report for International Appl. No. PCT/US2012/027635 dated Oct. 30, 2012, 3 pages.
"Internet Information Services 7.5", Retrieved at <<http://technet.microsoft.com/en-us/library//dd364124(wa.10).aspx>>, Mar. 24, 2009, 3 pages.
Microsoft-TechNet.com, "Device Management and Installation Step-by-Step Guide: Signing and Staging Defvice Drivers in Windows 7 and Windows Server 2008 R2" retrieved Aug. 19, 2012, 3 pages.
Office Action for U.S. Appl. No. 13/107,973, mailed on Dec. 21, 2012 for for Bond, et al., "Instruction Set Emulation for Guest Operating Systems", 12 pages.
Office Action for U.S. Appl. No. 13/107,973, mailed on Jun. 10, 2013 for Bond, et al., "Instruction Set Emulation for Guest Operating Systems", 14 pages.
Office action for U.S. Appl. No. 12/972,081, mailed on Sep. 10, 2013, Douceur, et al., "Application Compatibility Shims for Minimal Client Computers", 18 pages.
Office action for U.S. Appl. No. 13/372,390, mailed on Sep. 19, 2013, Baumann, et al., "Cryptographic Certification of Secure Hosted Execution Environments", 20 pages.
Office action for U.S. Appl. No. 13/196,235, mailed on Oct. 15, 2013, Douceur, et al., "Constraining Execution of Specified Device Drivers", 29 pages.
Office action for U.S. Appl. No. 13/323,562, mailed on Oct. 23, 2013, Baumann, et al., "Facilitating System Service Request Interactions for Hardware-Protected Applications", 16 pages.
Office action for U.S. Appl. No. 13/107,973, mailed Oct. 25, 2013, Bond, "Instruction Set Emulation for Guest Operating Systems", 12 pages.
Bagchi, "On Reliable Distributed IPC/RPC Design for Interactive Mobile Applications", ACM Conference on Management of Emergent Digital EcoSystems, Oct. 2010, 6 pages.
Gregg et al., "Overview of IBM zEnterprise 196 I/O subsystem with focus on new PCI Express infrastructure", International Business Machines Corporation, vol. 56 No. 1/2 Paper 8, 2012, 14 pages.
Kobayashi, et al., "Quick Reboot-based Recovery for Commodity Operating Systems in Virtualized Server Consolidation," Retrieved at <<http://eurosys2010-dev.sigops-france.fr/workshops/IIDS2010/iids2010_7.pdf>>, Feb. 2010, Association for Computing Machinery, 6 pages.
Zhou et al., "Flexible On-Device Service Object Replication with Replets", In the Proceedings of the 13th International Conference on World Wide Web, May 17, 2004, pp. 131-142.
Office Action for U.S. Appl. No. 12/834,895, mailed on Nov. 6, 2012, Hunt, et al., "Ultra-Low Cost Sandboxing for Application Appliances", 19 pages.
Office Action for U.S. Appl. No. 13/345,031, mailed on Nov. 6, 2013, Hunt, et al., "Dynamic Application Migration", 8 pages.
Office action for U.S. Appl. No. 12/463,892, mailed on Dec. 6, 2011, Howell, J.R., "Executing Native-Code Applications in a Browser", 20 pages.
Office Action for U.S. Appl. No. 13/215,244, mailed on Feb. 28, 2014 for Bond, et al., "Migration of Coud Applications Between a Local Computing Device and Cloud," 15 pages.
Office Action for U.S. Appl. No. 12/834,895, mailed on Apr. 30, 2013, Hunt, et al., "Ultra-Low Cost Sandboxing for Application Appliances", 23 pages.
Office Action for U.S. Appl. No. 12/972,081, mailed on Apr. 7, 2014, Douceur et al., "Application Compatibility Shims for Minimal Client Computers", 27 pages.
Office action for U.S. Appl. No. 13/196,235, mailed on Apr. 9, 2014, Douceur et al., "Constraining Execution of Specified Device Drivers", 34 pages.
Office Action for U.S. Appl. No. 13/107,973, mailed May 21, 2014, for Bond, et al., "Instruction Set Emulation for Guest Operating Systems," 14 pages.

(56) References Cited

OTHER PUBLICATIONS

Non-Final Office Action for U.S. Appl. No. 13/196,235, mailed on Jul. 3, 2014, Douceur et al., "Constraining Execution of Specified Device Drivers", 31 pages.
Office Action for U.S. Appl. No. 13/314,512, mailed on Jul. 30, 2013, Hunt, et al., "Application Compatibility with Library Operating Systems", 19 pages.
Tan, et al. "iKernel: Isolating Buggy and Malicious Device Drivers Using Hardware Virtualization Support", Proceedings of the Third IEEE International Symposium on Dependable, Autonomic and Secure Computing (DASC 07), Sep. 2007, 9 pages.
Vaughan-Nichols, "New Approach to Virtualization is a Lightweight," retrieved at <<http://ieeexplore.ieee.org/stamp/stamp.jsp?tp=&arnumber=4014757>>, IEEE, Computer, vol. 39, Issue 11, Nov. 2006, pp. 12-14.
Yee et al., "Native Client: A Sandbox for Portable, Untrusted x86 Native Code", 2009 30th IEEE Symposium on Security and Privacy, May 2009, 15 pages.
Yu et al., "A Feather-weight Virtual Machine for Windows Applications", VEE'06, Jun. 2006, 11 pages.
NPL Search Results U.S. Appl. No. 13/196,235, Elsevier Eng. Info. Inc., 2013, 23 pages.
Translated Chinese Office Action mailed Jan. 28, 2015 for Chinese patent application No. 201210537282.X, a counterpart foreign application of U.S. Appl. No. 13/323,562, 14 pages.
Translated Chinese Office Action mailed Dec. 3, 2014 for Chinese patent application No. 201210533610.9, a counterpart foreign application of U.S. Appl. No. 13/323,465, 12 page.
The European Office Action mailed Oct. 21. 2014 for European patent application No. 12858587.4, a counterpart foreign application of U.S. Appl. No. 13/323,465, 7 pages.
The Supplementary European Search Report mailed Sep. 3, 2014 for European Patent Application No. 12858587.4, 3 pages.
Final Office Action for U.S. Appl. No. 13/314,512, mailed on Jul. 15, 2014, Hunt, et al., 29 pages.
Final Office Action for U.S. Appl. No. 13/215,244, mailed on Sep. 26, 2014, Bond, et al., 17 pages.
International Search Report and Written Opinion for PCT Application PCT/US2012/067662 dated Mar. 11, 2013, 6 pages.
International Search Report and Written Opinion for PCT Application PCT/US2012/067660 dated Mar. 20, 2013, 4 pages.
Microsoft Corp, "Internet Information Services 7.5", retrieved at <<http:technet.microsoft.com/en-us/library/dd364124 (v=ws.10).aspx>>, Mar. 2009, 2 pages.
Microsoft Press, "Microsoft Computer Dictionary, 5th Edition", One Microsoft Way, Redmond, WA, Copyright 2002, 648 pages.
Office action for U.S. Appl. No. 13/196,235, mailed on Nov. 21, 2014, Douceur, et al., "Constraining Execution of Specified Device Drivers", 30 pages.
Office action for U.S. Appl. No. 13/372,390, mailed on Dec. 19, 2014, Baumann, et al., "Cryptographic Certification of Secure Hosted Execution Environments", 23 pages.
Parno, et al., "Memoir Practical State Continuity for Protected Modules", Proceedings of the IEEE Symposium on Security and Privacy, May 2011, 16 pages.
Verizon Wireless, "Escaping from Microsoft Protected Mode Internet Explorer Evaluating a Potential Security Boundary", White Paper, Nov. 2011, 8 pages.
The European Office Action mailed May 27, 2015 for European patent application No. 12858489.3, a counterpart foreign application of U.S. Appl. No. 13/323,562, 5 pages.
The Supplementary European Search Report mailed May 7, 2015 for European Patent Application No. 12858489.3, 3 pages.
Extended European Search Report mailed Oct. 27, 2014 for European Patent Application No. 12752531.9, 9 pages.
Office action for U.S. Appl. No. 13/331,078, mailed on Dec. 22, 2014, Hunt, et al., "Lightweight On-Demand Virtual Machines", 7 pages.

Office action for U.S. Appl. No. 13/215,244, mailed on Feb. 23, 2015, Bond, et al., "Migration of Cloud Application Between a Local Computing Device and Cloud", 20 pages.
Office action for U.S. Appl. No. 13/196,235, mailed on Mar. 17, 2015, Douceur et al., "Constraining Execution of Specified Device Drivers", 33 pages.
Office action for U.S. Appl. No. 13/314,512, mailed on Jul. 15, 2014, Hunt, et al., "Application Compatibility with Library Operating Systems", 29 pages.
Sahita, et al., "Beyond Ring-3: Fine Grained Application Sandboxing", W3C Workshop on Secutiy for Access to Device APIs from the Web, Dec. 2008, 5 pages.
Translated Chinese Office Action mailed Nov. 30, 2015 for Chinese patent application No. 201210537282.X, a counterpart foreign application of U.S. Appl. No. 13/323,562, 6 pages.
U.S. Appl. No. 61/449,072, filed Mar. 3, 2011, entitled, "Library-Operating-System Packaging-Model Scenarios," 35 pages.
Translated Chinese Office Action mailed Jan. 26, 2016 for Chinese Patent Application No. 201280011551.7, a counterpart foreign application of U.S. Appl. No. 13/314,512, 12 pages.
Translated Chinese Office Action mailed Feb. 26, 2016 for Chinese Patent Application No. 201210533610.9, a counterpart foreign application of U.S. Appl. No. 13/323,465, 6 pages.
Final Office Action for U.S. Appl. No. 13/314,512, mailed on Dec. 14, 2015, Hunt et al., "Application Compatibility with Library Operating Systems," 14 pages.
Keetch, "Escaping from Protected Mode Internet Explorer," Verizon Business, retrieved at https://www.google.com/webhp?sourceid=chrome-instant&ion=1&espv=2&ie=UTF-8#q=keetch+escaping+from+protected+mode+internet+explorer+>>, 2009, 47 pages.
Lorch et al., "Building VTrace, a Tracer for Windows NT and Windows 2000", University of California, Berkeley, computer Science Division, Report No. UCB/CSD-00/1093, Feb. 2000, 18 pgs.
Mergen et al, "Virtualization for High-Performance Computing", ACM SIGOPS Operating Systems Review, vol. 40, Issue 2, Apr. 2006, 4 pgs.
Non-Final Office Action, for U.S. Appl. No. 13/331,078, mailed on Feb. 1, 2016, Hunt et al, "Lightweight on Demand Virtual Machines," 9 pgs.
Sapuntzakis et al, "Optimizing the Migration of Virtual Computers", Proc 5th Symposium on Operating Systems Design and Implementation, Dec. 2002, 14 pgs.
"Sun Bytecode Verifier Vulnerability", US Department of Energy, Computer Incident Advisory Center, Information Bulletin, Mar. 19, 2002, 5 pgs.
Taiwanese Office Action and Search Report mailed Nov. 18, 2015 for Taiwanese Patent Application No. 101112828, a counterpart foreign application of U.S. Appl. No. 13/314,512, 7 pages.
Translated the Chinese Office Action mailed Aug. 21, 2015 for Chinese patent application No. 201210533610.9, a counterpart foreign application of U.S. Appl. No. 13/323,465, 9 pages.
Office Action for U.S. Appl. No. 13/314,512, mailed on Jun. 25, 2015, Hunt et al., "Application Compatibility with Library Operating Systems", 12 pages.
Office Action for U.S. Appl. No. 13/331,078, mailed on Jul. 16, 2015, Hunt et al., "Lightweight On-Demand Virtual Machines", 10 pages.
Office action for U.S. Appl. No. 13/372,390, mailed on Jul. 22, 2015, Baumann et al., "Cryptographic Certification of Secure Hosted Execution Environments", 24 pages.
Office action for U.S. Appl. No. 13/196,235, mailed on Sep. 22, 2015, Douceur et al., "Constraining Execution of Specified Device Drivers", 36 pages.
"AWS CloudHSM", retrieved on Oct. 28, 2013, available at: http://aws.amazon.com/cloudhsm/, 5 pages.
International Search Report and Written Opinion for PCT Application PCT/US2015/038204 dated Sep. 4, 2015, 9 pages.
Karme, Anil, "Building YOURcloud: The Federal Government's first Secure Hybrid Community Cloud", retrieved on: Oct. 30, 2013, available at: http://www.govmarkcouncil.com/presentations/event112912/Anil_Karmel.pdf, RightPath, 39 pages.

(56) References Cited

OTHER PUBLICATIONS

Karthik, P, et al., "A Secure Access Code Technique for Remote Data Integrity on Public Cloud", International Journal of Computer Applications, vol. 77, Issue 14, Sep. 2013, pp. 26-31.

Masti, et al.,"An Architecture for Concurrent Execution of Secure Environments in Clouds", In Proceedings of in the ACM Cloud Computing Security Workshop, Nov. 8, 2013, 12 pages.

McKeen, et al., "Innovative Instructions and Software Model for Isolated Execution" In Proceedings of the 2nd International Workshop on Hardware and Architectural Support for Security and Privacy, Jun. 24, 2013, 8 pages.

Office action for U.S. Appl. No. 13/215,244, mailed on Oct. 1, 2015, Bond et al., "Migration of Cloud Applications Between a Local Computing Device and Cloud", 20 pages.

"Safenet Hardware Security Modules (HSMs)", Retrieved on Oct. 31, 2013, available at: http://www.safenet-inc.com/products/data-protection/hardware-security-modules-hsms/, 8 pages.

Sedayao, Jeff, "Enhancing Cloud Security Using Data Anonymization", In white Paper of Intel, Jun. 2012, 8 pages.

"Thoughts on Intel's upcoming Software Guard Extensions (Part 2)", published on: Sep. 23, 2013, available at: http://sec.soup.io/post/348921006/Thoughts-on-Intels-upcoming-Software-Guard-Extensions, 8 pages.

"What is Apple's New Secure Enclave and Why is it Important?", published on: Sep. 18, 2013, available at: http://www.forbes.com/sites/quora/2013/09/18/what-is-apples-new-secure-enclave-and-why-is-it-important/2/, 5 pages.

* cited by examiner

CRYPTOGRAPHIC CERTIFICATION OF SECURE HOSTED EXECUTION ENVIRONMENTS

RELATED APPLICATION

The present application is related to U.S. patent application Ser. No. 12/323,562, filed concurrently.

BACKGROUND

In a conventional computing environment, the user controls physical access to the user's computing systems. The user trusts, to some degree, the hardware and software in its data centers. This trust, combined with physical control of the devices, provides the user with a certain degree of confidence that their computing systems are secure.

In a hosted computing environment, the user typically does not have physical control over the computing systems used to execute the user's applications. The user, in addition to trusting the hardware and software that executes in the hosted computing environment, has no choice but to trust the hosted computing provider not to tamper with or snoop on the user's code and data. The user also trusts the hosted computing provider to provide physical security sufficient to prevent unauthorized persons from removing hard disks or tampering with the system. And users place their trust in the hosted computing provider to prevent third parties from tampering with or stealing their data. A hosted computing provider may therefore incur a certain amount of liability, in the form of guarantees and the like, to encourage users to run their software in the provider's hosted computing environment.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure enable an application hosting service to cryptographically certify that it provides a secure execution environment that is resistant to snooping and tampering such that it includes, for example, only the user's trusted code and data. In order to service a request from a client system to establish a secure execution environment, a protected memory area is instantiated by a security-enabled processor. The hosted computing system goes through an attestation protocol to provide verifiable facts about the security-enabled processor and the software and data in the secure execution environment, such as the manufacturer and model of the security-enabled processor and the vendor or code identity of the software. Upon successful completion of the attestation protocol, a cryptographically protected communication channel is established between the client system and the secure execution environment, and one or more applications are executed within the secure execution environment.

The application hosting service may use various trust certificates, including certificates from a trusted authority and one or more intermediaries, to establish a chain of trust from the security-enabled processor to the trusted authority. These trust certificates collectively may be used in the attestation protocol to certify the security-enabled processor's security. The application hosting service may be audited to verify that the security-enabled processors of the application hosting service are physically secured and have not been tampered with. The auditor may provide an auditor certificate that may be used as part of the attestation protocol. Alternatively, the auditor may make the results of the audit available in other ways (e.g. publish them on the internet). The application hosting service may use (in the attestation protocol) cryptographic credentials for the processor, produced by the hardware manufacturer, vouching for the integrity and proper functioning of the security-enabled processor.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
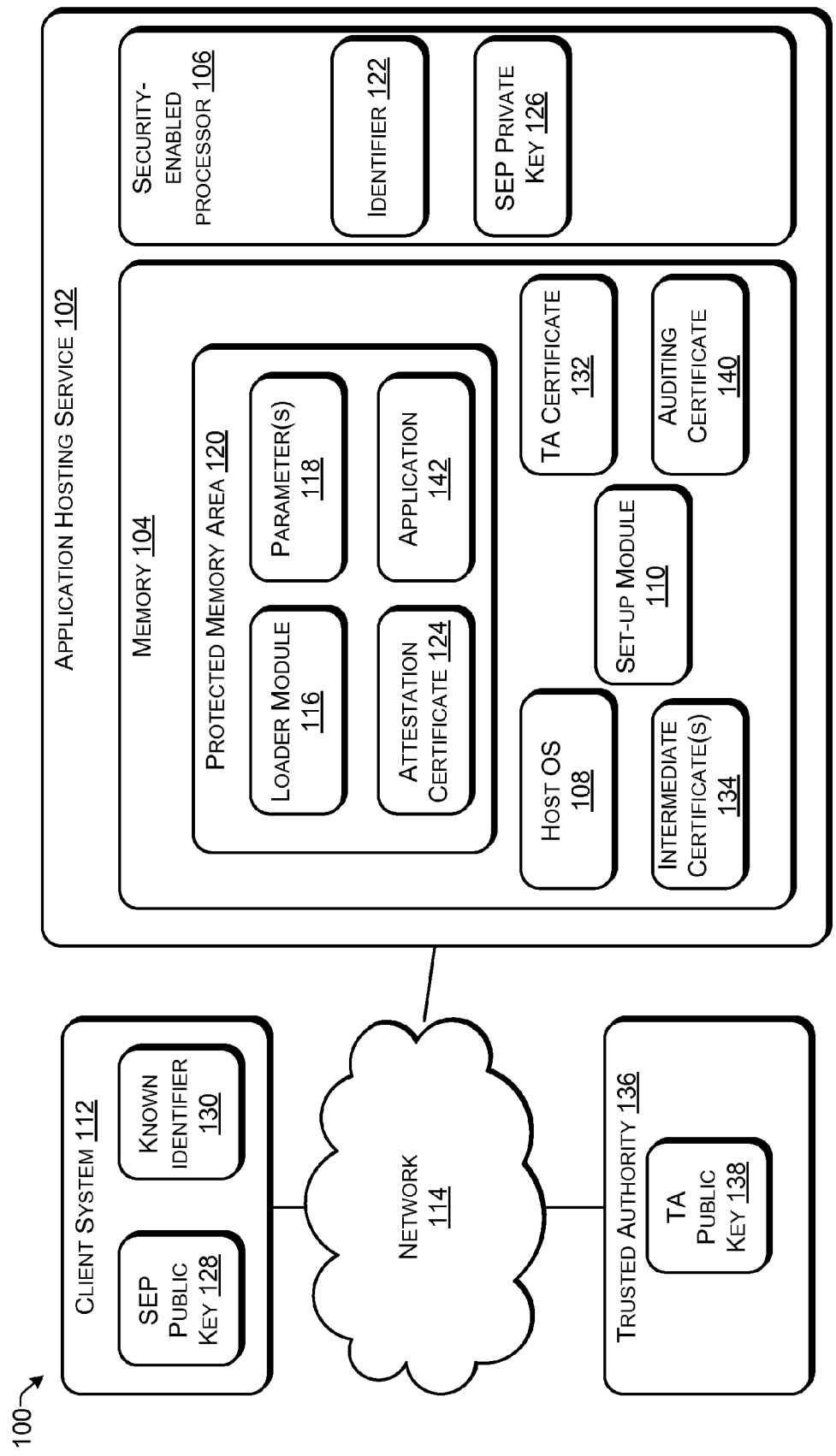
FIG. 1 is a schematic diagram of an example system usable to provide a secure execution environment.

As discussed above, a user places a certain degree of trust in a conventional hosted computing provider to securely execute the user's applications and safeguard the user's data. Embodiments of the present Detailed Description allow the hosted computing service to provide cryptographic certification both that a user's execution environment is resistant to tampering and snooping, and that the user's execution environment is established with the content that the client requests and with no untrusted code or data. Providing a secure execution environment that is free from outside snooping and tampering may, by itself, enable a nefarious hosted computing provider to set up the execution environment with untrusted code that is able to snoop on or tamper with the user's code and data from within. And simply providing an execution environment with nothing but the user's trusted code and data may, by itself, enable the hosted provider or a third party to tamper with or snoop on the contents of the execution environment from outside the execution environment. But embodiments of the present disclosure enable a hosted computing provider to cryptographically certify that it provides a secure execution environment that is resistant to outside snooping and tampering and that includes no untrusted code and data.

Computing systems according to embodiments include a security-enabled processor configured to instantiate, for a client system (such as a computing device controlled by a hosted computing user or consumer), a secure computing environment including a protected memory area. The code and data selected by the client system is stored in a protected memory area and is accessible to code stored in the protected memory area, but inaccessible to all code executing outside the protected memory area. The latter includes code running in other protected memory areas that might exist. The code in the secure execution environment can be chosen by the client system, the service provider, third parties, or a combination of all of them. For example, the client system might choose to execute only its application code (including support libraries) in the secure execution environment. The execution of this code is protected from all other code on the computer.

Threads can transition from running code outside the protected memory area to running code inside the protected memory area only through specific entry gate functions mediated by the security-enabled processor. Likewise, threads transition from running code inside the protected memory area to running code outside the protected memory area through specific exit gate functions mediated the security enabled processor. The code that runs in the protected memory area has no special privileges except the ability to access code and data in the protected memory area. For example, the code that runs in the protected memory area does not need to run in the processor's kernel mode or privileged mode, nor does it need access to instructions, such as I/O instructions, accessible only to the processor's kernel mode or privileged mode. The hardware-protected memory area is brought to a well-known initial state and then loaded with a loader module and one or more parameters specified by the user's client system in order to establish a requested activation state of the protected memory area.

The trusted execution environment provides a mechanism by which the user-trusted code running within the protected memory area certifies to the client system that it is running within a secure execution environment. The security-enabled processor performs an attestation protocol, involving providing the client system with a certification that a secure execution environment is established, and that in an initial activation state of the secure execution environment, only the software identified (explicitly or implicitly) in a request from the client user is executed. The attestation protocol may involve the client or other parties. The purpose of the attestation protocol is to cryptographically verify to the client system (or other system) that the secure execution environment has particular properties. These properties may include, in various non-limiting examples:

1. The manufacturer and model of the security-enabled processor.
2. The code and data with which the secure execution environment was initiated.
3. The software provider and other information about the code and data with which the secure execution environment was initiated. For example,
    a. the software was written by (and signed by) a particular software developer/vendor
    b. the software is a particular version with security patches as of a particular date. In various non-limiting embodiments, the software provider signs certificates containing digests, such as hashes of the relevant software modules.

Non-limiting examples of attestation protocols include:
Direct Anonymous Attestation (reference: E. Brickell, J. Camenish, L. Chen. Direct anonymous attestation. In Proceedings of the 11$^{th}$ ACM conference on computer and communications security. Pages 132-145, 2004.
Standard public key protocols involving attestation certificates signed with the private key of the security-enabled processor.

The following describes various embodiments of an attestation protocol. Embodiments are not limited to the following embodiments, and the attestation protocol described below may include additional functionality, such as with chains of trust rooted in one or more trusted certificate authorities, without departing from the scope of the present Detailed Description. Once the protected memory area is instantiated with the requested activation state, the security-enabled processor produces an identifier that identifies the initial activation state of the hardware-protected memory area and stores the identifier in a location accessible only to the security-enabled processor. The identifier may include a digest, such as a hash, of the activation state of the protected memory area. The identifier may include a public key that the security-enabled processor used to decrypt the contents placed into the protected memory area in the activation state. The identifier may be some other identifier that identifies the activation state.

The loader module is executed and causes the security-enabled processor to create an attestation certificate signed by a private key of the security-enabled processor. The signed attestation certificate is transmitted to the client system and therefore enables the client system to verify, using a known public key of the security-enabled processor that corresponds to the private key of the security-enabled processor, that the attestation certificate is signed by the security-enabled processor. The signed attestation certificate also enables the client system to verify that the client system communicates with a loader module running in a protected memory area created by the security-enabled processor. Thus, a trust relationship is formed between the client system and the security-enabled processor. A chain of trust including additional certificates from a trusted authority, and possibly one or more intermediaries, may be used in embodiments to establish the trust relationship.

The attestation certificate includes the identifier of the activation state of the protected memory area. The client system compares the identifier with a known identifier of the requested activation state to determine that the activation state of the protected memory area is the requested activation state, including the loader module and the one or more parameters. Because the attestation certificate with the identifier is signed/encrypted with the security-enabled processor's private key, and because a trust relationship is established between the client system and the security-enabled processor, the client system is able to rely on the identifier to determine that the activation state of the protected memory area is the requested activation state.

Thus, embodiments provide the client system with verification of both that the hosted computing provider establishes a secure execution environment resistant to tampering and snooping, and that the secure execution environment is instantiated with the requested activation state. The signed attestation certificate provides the client system with verification that the secure execution environment is established. And the identifier provides the client system with verification that the secure execution environment is instantiated with the requested activation state. The client system then utilizes the secure execution environment to load and execute requested applications.

Although the security-enabled processor may be resistant to casual physical attacks, it may be vulnerable to physical tampering. The hosted computing system is also configured, in various embodiments, to certify to the client system that the security-enabled processor is physically secure, for example in one embodiment the hosted computing system is configured to transmit an auditor certificate, signed by an auditing entity's private key, declaring that the security-enabled processor has not been physically tampered with during a specific time period. Personnel from the auditing entity may periodically or continually monitor the hosted computing service to determine that the security-enabled processors are physically intact. The auditor certificate therefore provides the client system with additional degrees of confidence in the secure execution environment. In another embodiment, the client system presents the certificate of the security-enabled processor directly to a computer system of the auditing entity requesting verification of the processor's physical security. The computer system of the auditing entity responds with a certificate verifying that the security-enabled processor has not been physically tampered with.

The application hosting service according to various embodiments described herein runs only code in the secure execution environment that has been selected by the client system. An entity associated with the client system may write all of the software that runs within the secure execution environment, or the entity may outsource portions of the software to software providers that the entity trusts. In one non-limiting example, the client system may select an application from a trusted application software vendor and a library operating system from a trusted operating system vendor. The entity associated with the client system is considered the software vendor for the portions of the software created directly by the entity. The software vendors may provide certificates for signed binaries verifying that the software binary files are indeed the ones provided by the software vendors respectively, and that the binaries have not been altered.

With these divisions of responsibility, the application hosting service acts as an intermediary, but does not actually certify the integrity of any system component. The security-enabled processor vendor certifies the secure execution environment. The auditing entity certifies the physical security of the secure execution environment. The software providers certify the software running within the secure execution environment. The application hosting service may perform some, none, or all of these roles in various embodiments. In embodiments, the application hosting service provider maintains availability of the computing facility, which includes providing the computing facility, power, and network connectivity, and other entities, such as the hardware providers, software providers, and auditing entities, provide for other various aspects of the security of the applications being hosted.

Examples of application hosting services include internet hosting facilities, cloud computing providers, outsourced corporate data centers, corporate data centers operated by contract, and content delivery networks.

The processes, systems, and devices described herein may be implemented in a number of ways. Example implementations are provided below with reference to the following figures.

Example Environment for Providing a Secure Execution Environment

FIG. 1 is a schematic diagram of an example system 100 usable to provide a secure execution environment. Aspects of the system 100 may be implemented on various suitable computing device types that are capable of implementing an application hosting computing system, a client computing system, and so forth. Suitable computing device or devices may include, or be part of, one or more personal computers, servers, server farms, datacenters, special purpose computers, tablet computers, game consoles, smartphones, combinations of these, or any other computing device(s) capable of storing and executing all or part of a secure execution environment.

An application hosting service 102 includes a memory 104 and a security-enabled processor 106. The memory 104 includes a host operating system (OS) 108 and a set-up module 110. Although the set-up module 110 is shown in FIG. 1 to be separate from the host OS 108, the set-up module 110 may be a component of the host OS 108. Also, the application hosting service 102 may include multiple processors, including multiple security-enabled processors such as the security-enabled processor 106. The host OS 108 and/or the set-up module 110 may execute on the security-enabled processor 106, or on one or more other processors not shown in FIG. 1.

System 100 performs various functions, such as but not limited to one or more of the following: (a) initializing secure execution environments with code and data; (b) receiving client requests to bind an instance of a secure execution environment to a client system and configure it to run the client's software; (c) binding an instance of a secure execution environment to a client and configuring the secure execution environment to run the client's software; (d) providing to the client a certified specification of the software that is to run within the secure execution environment. These various functions may be performed in different orders, depending on specific embodiments. Furthermore, specific embodiments may combine some of the functions.

In one embodiment, the hosting service may perform function (b) prior to performing other ones of the above-mentioned functions. When a client request arrives, the hosting service initializes a secure execution environment (action a). The hosting service may include code and/or data (e.g. parameters) supplied in the client request in the initialization. Thus, binding (action c) may be performed implicitly as part of action (b). Alternatively, the hosting service may initialize the secure execution environment (action a) with generic code and data (not specific to the client) and bind the secure execution environment to a client (action c) in a separate step.

In another embodiment, the hosting service initializes one or more secure execution environments (action a) with generic code and data. This generic code and data could provide a generic run time environment for arbitrary applications. When a client request arrives (action b), the hosting service selects one of the previously initialized secure execution environments and binds it to the client (action c) by sending it code or data from the client request.

Actions (c) and (d) can be combined. For example, variants of authenticated key exchange protocols may perform an attestation protocol. The attestation protocol provides to the client verifiable properties about the software and data in the secure execution environment (action d) and establishes a shared cryptographic key between the secure execution environment and the client (action c).

The following example is a detailed description of one class of embodiments. The set-up module 110 receives a request from the client system 112, via network 114, to establish a secure execution environment on the application hosting service 102. The network 114 may be the public Internet, or some other wired or wireless network type. Embodiments are not limited to any type or types of networks. The request is accompanied by an indication of a loader module 116 and one or more parameters 118. The indication of the loader module 116 may be an identifier for the loader module 116, or it may be an application binary of the loader module 116 itself, or some other indicator. In embodiments where the indication of the loader module 116 is an identifier, it may be a uniform resource identifier (URI), such as a uniform resource locator (URL), identifying the loader module 116 and possibly a location where the loader module 116 can be found.

The set-up module 110 causes, in response to receipt of the request, the security-enabled processor 106 to instantiate a protected memory area 120, which is a hardware-protected memory area, within memory 104. The set-up module 110 provides the security-enabled processor 106 with pointers to the loader module 116 and the parameters 118, and instructs the security-enabled processor 106 to bring the protected memory area 120 to a well-known initial state (such as all memory addresses within the protected memory area 120 and all appropriate registers within the security-enabled processor 106 zeroed-out, or to some other well-known initial state), and to load the loader module 116 and the parameters 118 into the protected memory area 120 after bringing the protected memory area 120 to the well-known initial state. The instantiation of the protected memory area 120 first into the well-known initial state and then loaded with the loader module 116 and the parameters 118 represents a requested activation state of the protected memory area 120. In other words, it represents the state of the secure execution environment that the client device specifies in its request to set up a secure execution environment.

The combination of the protected memory area 120 and execution of code therein by the security-enabled processor 106 represents the secure execution environment. Although the protected memory area 120 is shown as being part of a contiguous memory area that also includes the host OS 108 and the set-up module 110, the protected memory area 120 may in alternative embodiments be part of a separate memory area, such as a memory area on the same integrated circuit as the security-enabled processor 106 that physically isolates the protected memory area 120 from the rest of the application hosting service 102.

The security-enabled processor 106 may be configured to encrypt and decrypt all data written to and read from, respectively, the protected memory area 120 in order to prevent outside snooping on the protected memory area 120. The security-enabled processor 106 may also be configured to produce hashes, or other digests, of the data written to the protected memory area 120 in order to verify, upon a read of the contents of the protected memory area 120, that the contents have not been altered.

As part of the instantiation process, the security-enabled processor 106 produces an identifier 122 identifying the activation state of the protected memory area 120. The identifier may be, in various embodiments, a digest—such as a hash—of the contents of the protected memory area 120 in the activation state. The identifier may be a public key corresponding to a private key that was used to sign the software stored in the protected memory area 120. The activation state includes the loader module 116, the parameters 118, and any other code or data placed into the protected memory area 120 upon instantiation. The identifier 122 may be stored in a location that is accessible only to the security-enabled processor 106, such as in a register or memory location within the security-enabled processor 106 that is inaccessible except by the security-enabled processor 106, or perhaps encrypted in an area of memory 104. In embodiments wherein the identifier is a hash of the contents of the protected memory area 104 in the activation state, the security-enabled processor produces the hash using a cryptographic hash function, such as the MD5 Message-Digest Algorithm, Secure Hash Algorithms SHA-0, SHA-1, SHA-2, or other hash function.

Upon instantiation of the protected memory area 120 with the loader module 116 and the parameters 118, the set-up module 110 instructs the security-enabled processor 106 to execute the loader module 116, such as through an entry function or gate which the security-enabled processor 106 uses in order to enable the secure execution environment to receive communications from outside the secure execution environment. An instance of the loader module 116 executes on the security-enabled processor and causes the processor to create an attestation certificate 124 signed by a security-enabled processor (SEP) private key 126. The SEP private key 126 is permanently stored on the security-enabled processor 106 in a way that is accessible only to the security-enabled processor 106. Thus, so long as the security-enabled processor 106 is physically intact, an entity receiving the attestation certificate 124 can have a high degree of confidence that the signed attestation certificate 124 is signed by the security-enabled processor 106.

The attestation certificate 124 may include, among other things, the identifier 122. The loader module 116 then transmits the attestation certificate to the client system 112, via an exit function or exit gate employed by the security-enabled processor to enable the secure execution environment to communicate with the outside world. Alternatively, the identifier 122 may be encrypted with the SEP private key 126 and transmitted to the client system 112 separately from the attestation certificate 124 (which would also be signed/encrypted using the SEP private key 126).

Upon receipt of the attestation certificate 124, the client system 112 decrypts it using a SEP public key 128 that corresponds to the SEP private key 126 of the security-enabled processor. The means by which the client system 112 obtains the SEP public key 128 is described below.

The client system 112 compares the identifier 122 contained within the decrypted attestation certificate 124 with a known identifier 130 of the requested activation state of the secure execution environment. A determination that the known identifier 130 matches the identifier 122 provides the client system 112 with a high degree of confidence that the actual activation state of the protected memory area 120 matches the requested activation state of the protected memory area 120. In various non-limiting examples, successful verification of the identifier 122 provides the client system 112 with confidence that the protected memory area 120 includes the loader module 116, the parameters 118, any other code or data implicitly or explicitly specified in the request to establish a secure execution environment, and nothing else. As noted above, the attestation certificate 124 is signed/encrypted by using the SEP private key that is accessible only by the security-enabled processor 106. The attestation certificate 124 includes the identifier 122 of the activation state of the protected memory area 120, and the identifier 122 is produced by the security-enabled processor 106 and may be stored securely in a way that makes the identifier 122 accessible only to the security-enabled processor 106.

Because the loader module 116 or other code (such as some malicious code surreptitiously loaded within the protected memory area 120) cannot access the SEP private key 126, the loader module 116 or other code cannot alter the identifier 122 without also altering the attestation certificate 124 and invalidating the security-enabled processor's 106 signature. Thus, upon successfully using the SEP public key 128 to verify that the attestation certificate 124 is properly signed using the SEP private key 126, and upon successfully verifying that the identifier 122 contained therein matches the known identifier 130, the client system 112 can have a high degree of confidence that it communicates with a secure execution environment that was instantiated with the requested activation state.

To achieve this high degree of confidence, the client system 112 forms a trust relationship with the security-enabled processor 106. Merely possessing the SEP public key 128 may be insufficient to establish that the security-enabled processor 106 is a true security-enabled processor that is properly configured to provide a secure execution environment on the application hosting service 102. A chain of trust is therefore provided to vouch for the authenticity of the security-enabled processor 106.

The loader module 116, or the set-up module 110, may transmit one or more trust certificates, such as a trusted authority (TA) certificate 132 and possibly one or more intermediary certificates 134. The TA certificate 132 is signed using a private key of a trusted authority 136. The TA certificate 132 identifies either the security-enabled processor 106, or possibly one or more intermediaries, and provides the public key of either the security-enabled processor 106 (i.e., the SEP public key 128), or public keys of the intermediate authority directly below it. The client system 112 may obtain the trusted authority (TA) public key 138 and use it to decrypt the TA certificate 132 and then obtain the public key published therein. Any intermediate certificates 134 are decrypted, and the public keys of any underlying intermediaries are extracted from the intermediate certificates 134. Ultimately, the client system 112 is able to obtain—either from the TA certificate 132 or from one of the intermediate certificates 134, the SEP public key 128.

This process creates a chain of trust from the trusted authority 136 to the security-enabled processor 106. Essentially, the trusted authority vouches for the most immediate intermediary, the intermediaries vouch for any lower-level intermediaries, and ultimately one of the intermediaries (or the trusted authority 136 if there are no intermediaries) vouches for the security-enabled processor 106 and provides the SEP public key 128. By following the chain of trust in this way, the client system 112 is able to establish a trust relationship with the security-enabled processor 106.

The trusted authority 136 may be the hardware manufacturer that manufactured the security-enabled processor 106. Alternatively, the trusted authority 136 may be some other entity that provides assurances that an intermediary—which may be the hardware manufacturer—is trustworthy.

In the same or different embodiments, the set-up module 110 is further configured to transmit, to the client system 112, an auditing certificate 140, signed by a private key of an auditor entity, indicating that the security-enabled processor has not been tampered with. In the same or alternative embodiments, the client system 112 provides the auditor entity with an identity of the security-enabled processor 106 (which may be included in the attestation certificate) and requests that the auditor entity provide the client system 112 with the auditing certificate 140. The auditor entity may employ one or many mechanisms for verifying the physical security of the security-enabled processor. For example, personnel of the auditor entity may periodically visit the data center(s) that house the application hosting service 102, physically inspect the computing devices, and verify that the security-enabled processor 106 is physically uncompromised, has not been tampered with, and is otherwise intact. In other embodiments, personnel of the auditor entity may continuously monitor the data center(s) that house the application hosting service 102 using closed circuit cameras, or personnel of the auditor entity may conduct random inspections of randomly-chosen computing devices within the data center(s) that house the application hosting service 102. Depending on the auditing processes employed, the auditor entity may offer different levels or degrees of certification of physical security to suit the business needs of various clients. In various embodiments, the auditing certificate 140 may be part of the chain of trust described above. Alternatively, the auditing certificate may be a stand-alone certificate (perhaps backed by its own chain of trust) used by the client system 112 to further verify that the facilities provided by the application hosting service 102 are secure.

Once the client system 112 verifies that the attestation certificate 124 is properly signed by the security-enabled processor 106 and that the identifier 122 contained therein matches the known identifier 130 (and possibly after verifying the chain of trust via the TA certificate 132 and the intermediate certificate(s) 134 and any other certificates such as the auditing certificate 140), the client system 112 and the loader module 116 may establish an encrypted communication channel. In one embodiment, to establish an encrypted communication channel, the client system 112 produces a session key, encrypts the session key with the SEP public key 128, and transmits the encrypted session key to the loader module 116. The loader module 116 receives the session key (such as through an entry function or gate of the security-enabled processor 106). The loader module 116 causes the security-enabled processor 106 to decrypt the session key using the SEP private key 126, and the loader module 116 establishes communications with the client system 112 using the decrypted session key The client system 112 and the loader module 116 use the session key to cryptographically protect communications between them.

The attestation protocol described above may be protected from various state replay attacks using various methods, such as those described in U.S. Pat. No. 7,421,579, issued to England et al. on Sep. 2, 2008 and entitled "Multiplexing a secure counter to implement second level secure counters"; U.S. Pat. No. 7,065,607, issued to England et al. on Jun. 20, 2006 and entitled "System and method for implementing a counter"; and as described in "Memoir: Practical State Continuity for Protected Modules", by Bryan Parno, Jacob R. Lorch, John R. Douceur, James Mickens, and Jonathan M. McCune, and published in Proceedings of the IEEE Symposium on Security and Privacy, IEEE, May 2011.

The client system 112 instructs the loader module 116 to load and execute an application 142. The loader module 116 then loads and executes the application 142 into the protected memory area 120. Alternatively, the application 142 is pre-identified by the parameters 118 and is loaded by the loader module 116 upon establishment of the encrypted channel. In still other embodiments, the parameters 118 include an application binary of the application 142, and the loader module 116 receives a command via the encrypted channel to execute the application 142. In other embodiments, the application 142 is loaded as part of the activation state of the protected memory area 120. In other embodiments, the application 142 is loaded over the Network 114 from an application vendor. Other variations are possible without departing from the scope of the present disclosure.

The application 142 may include an operating system subsystem (sometimes referred to as a "library OS") such as is described in U.S. patent application Ser. No. 12/834,895, filed Jul. 13, 2010 and entitled "ULTRA-LOW COST SANDBOXING FOR APPLICATION APPLIANCES." The operating system subsystem provides various operating system elements within the application process. The operating system subsystem also utilizes a small subset of application programming interfaces (APIs) to communicate with a host operating system, via an operating system platform adaptation layer (PAL), in order to provide the application 141 with basic computation services.

In any event, loading and executing the application 142 that is specified by the client system 112 in the secure execution environment may be the ultimate aim of the attestation protocol described above. The attestation protocol thus provides a user associated with the client system 112 with a high degree of confidence that the application 142 executes within a secure execution environment that is free of snooping and tampering from the outside, and that is loaded with no untrusted content.

Example Computing System for Providing an Application Hosting Service

Figure 2:
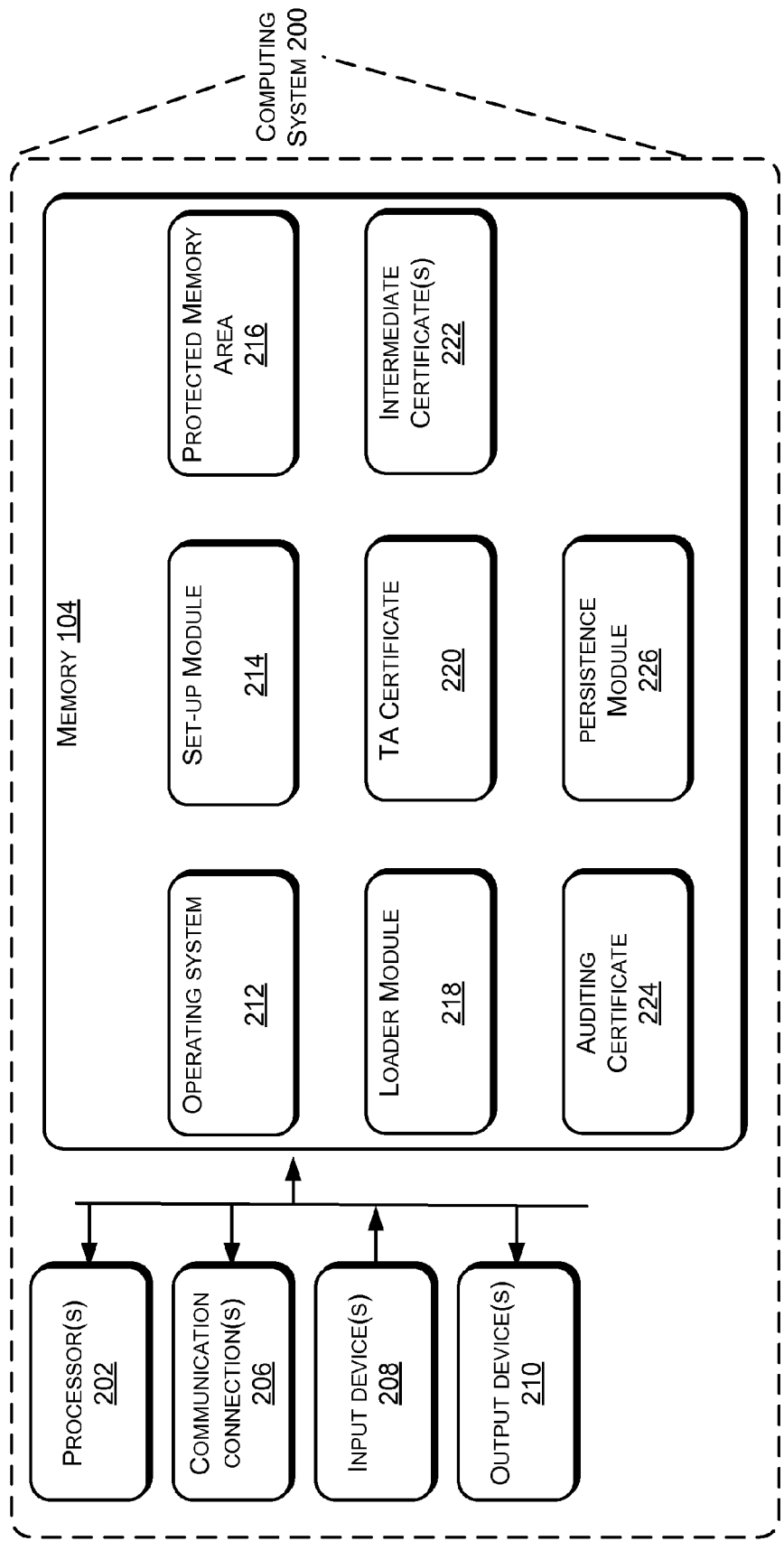
FIG. 2 is a block diagram of an example computing system usable to provide an application hosting service according to embodiments.

FIG. 2 is a block diagram of an example computing system 200 usable to provide an application hosting service according to embodiments. The computing system 200 may be configured as any suitable computing device capable of implementing an application hosting service. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of an application hosting service.

In one example configuration, the computing system 200 comprises one or more processors 202 and memory 204. The processors 202 include one or more security-enabled processors that are the same as or similar to security-enabled processor 106. The processors 202 may include one or more general-purpose or special-purpose processors other than a security-enabled processor. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200. The operating system 212 may be the same as or similar to the host OS 108. Memory 204 includes a set-up module 214, which may be the same as or similar to the set-up module 110. Memory 204 includes a protected memory area 216, established by the security-enabled processor. The protected memory area 216 may be the same as or similar to the protected memory area 120.

Memory 204 includes a loader module 218, which may be the same as or similar to the loader module 116. The loader module 218 may be loaded into the protected memory area 216 upon request by a client system. Memory 204 includes a TA certificate 220 and one or more intermediate certificates 222, which may be the same as or similar to the TA certificate 132 and the intermediate certificate(s) 134, respectively.

Memory 204 includes an auditing certificate 224, which may be the same as or similar to the auditing certificate 140. Memory 204 includes a persistence module 226, which may be the same as or similar to the persistence module 614.

Example Computing System for Providing a Client System

Figure 3:
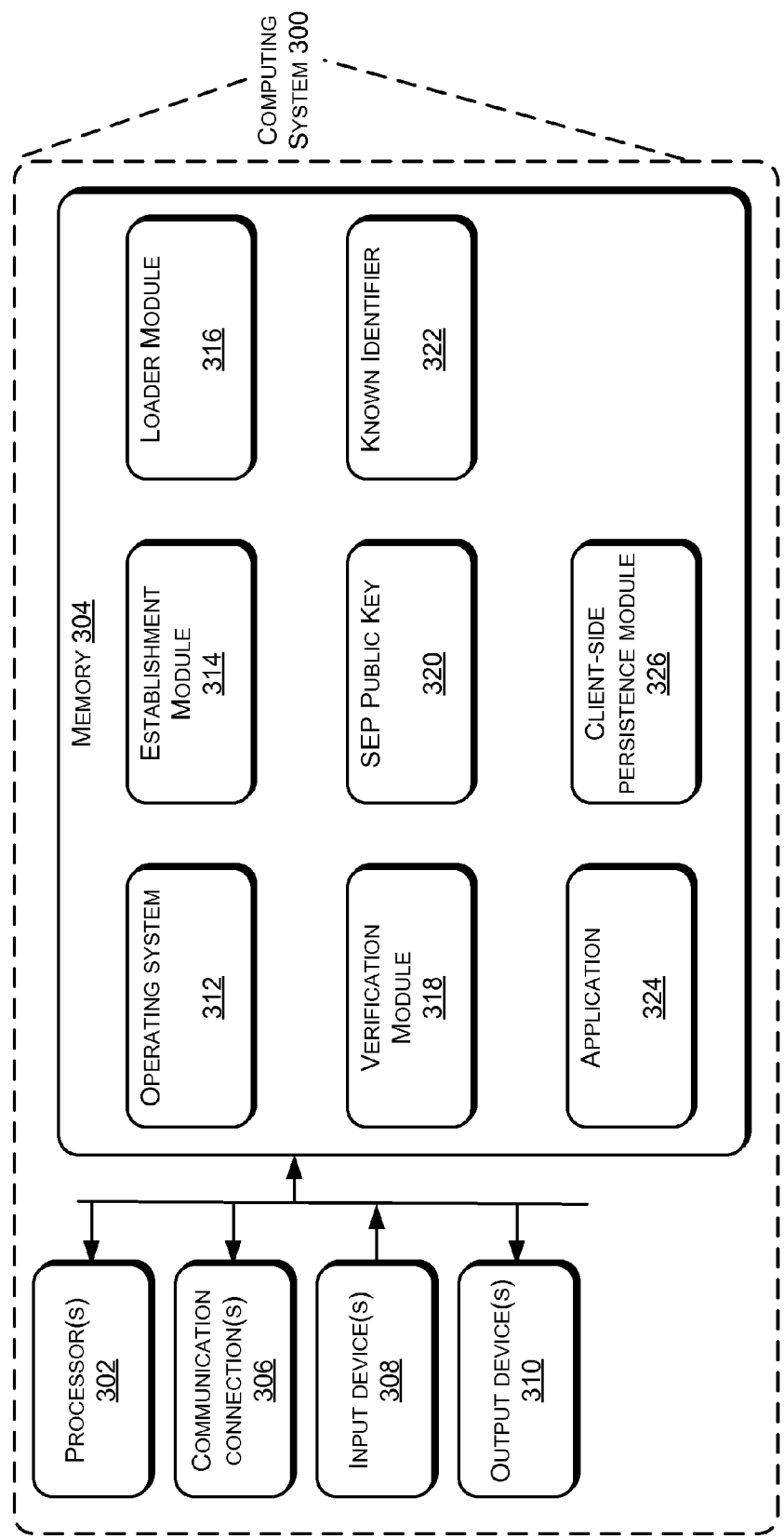
FIG. 3 is a block diagram of an example computing system usable to provide a client system according to embodiments.

FIG. 3 is a block diagram of an example computing system 300 usable to provide a client system according to embodiments. The computing system 300 may be configured as any suitable computing device capable of implementing a client system. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a client system.

In one example configuration, the computing system 300 comprises one or more processors 302 and memory 304. The computing system 300 may also contain communication connection(s) 306 that allow communications with various other systems. The computing system 300 may also include one or more input devices 308, such as a keyboard, mouse, pen, voice input device, touch input device, etc., and one or more output devices 310, such as a display, speakers, printer, etc. coupled communicatively to the processor(s) 302 and memory 304.

Memory 304 may store program instructions that are loadable and executable on the processor(s) 302, as well as data generated during execution of, and/or usable in conjunction with, these programs. In the illustrated example, memory 304 stores an operating system 312, which provides basic system functionality of the computing system 300 and, among other things, provides for operation of the other programs and modules of the computing system 300. Memory 204 includes an establishment module 314 configured to transmit a request to an application hosting service—such as the application hosting service 102—to establish a secure execution environment within the application hosting service. The request includes an indication of a requested activation state of the secure execution environment, such as a loader module 316 and one or more parameters that are to be loaded into the secure execution environment.

The verification module 318 is configured to receive, from an instance of the loader module 316 executing in a protected memory area of the application hosting service, an encrypted attestation certificate. The encrypted attestation certificate is encrypted/signed with a private key of a security-enabled processor of the application hosting service. The verification module 318 is, in various embodiments, configured to decrypt the attestation certificate using a SEP public key 320 of the security-enabled processor. Successful decryption of the attestation certificate with the SEP public key 320 indicates that the attestation certificate was encrypted/signed by the security-enabled processor. The verification module 318 is configured, in various embodiments, to receive one or more trust certificates, such as a trusted authority certificate and one or more intermediate certificates, to establish a chain of trust between the trusted authority and the security-enabled processor, as is described elsewhere within this Detailed Description. The one or more trust certificates may collectively vouch for the identity of the security-enabled processor and/or to indicate that the security-enabled processor is secure.

The verification module 318 is configured, in various embodiments, as part of or in addition to establishment of the chain of trust, to receive an auditing certificate signed by a private key of an auditor entity indicating that the security-enabled processor is physically uncompromised. The auditing certificate may be provided by the application hosting service, or by some other entity.

The verification module 318 is configured, in various embodiments, as part of or in addition to establishment of the chain of trust, to receive a processor certificate—such as from a manufacturer of the security-enabled processor—that indicates that the security-enabled processor is secure.

Upon successfully establishing a chain of trust, and verifying that any other certificates such as the auditing certificate and/or a processor certificate are valid (such as by decrypting such certificates using public keys of their issuers), the verification module 318 accepts that the security-enabled processor is a legitimate security-enabled processor.

The verification module 318 is configured to extract an identifier from the attestation certificate and compare it to known identifier 322. The known identifier 322 represents the requested activation state of the secure execution environment, as identified in the request transmitted by the establishment module. The establishment module 314 is configured to establish, in response to verification by the verification module 318 that the legitimacy of the security-enabled processor is verified and that the digest matches the known identifier 322 of the requested activation state, an encrypted connection with the instance of the loader module executing in the secure execution environment. The known identifier 322 may include a digest, such as a hash, of the requested activation state of the protected memory area. The known identifier 322 may include a public key matching a private key that was used to sign the contents placed into the protected memory area in the requested activation state. The known identifier 322 may be some other identifier that identifies the initial activation state. In some embodiments, the establishment module 314 produces a session key for the encrypted connection, encrypts the session key using the SEP public key 320 of the security-enabled processor, and transmits the encrypted session key to the instance of the loader module executing in the secure execution environment of the application hosting service. The encrypted connection utilizes the session key to send and receive data to and from the secure execution environment. Other embodiments of establishing an encrypted connection are possible without departing from the scope of this present Detailed Description The establishment module 314 instructs the instance of the loader module executing in the secure execution environment to load an application 324 for execution within the secure execution environment. Neither the application 324 nor the loader module need be included in the computing system 300. Rather, the establishment module 314 may instruct the loader module to download the application 324 from some other location, such as by providing a URI or URL for the application 324. The one or more parameters provided by the establishment module 314 in the request sent to the application hosting service may identify the application 324 for execution within the secure execution environment. The parameters may include a URI, URL, or other identifier of the application 324. Alternatively, the parameters may include an application binary for the application 324 that is directly loaded into the secure execution environment upon instantiation.

Figure 6:
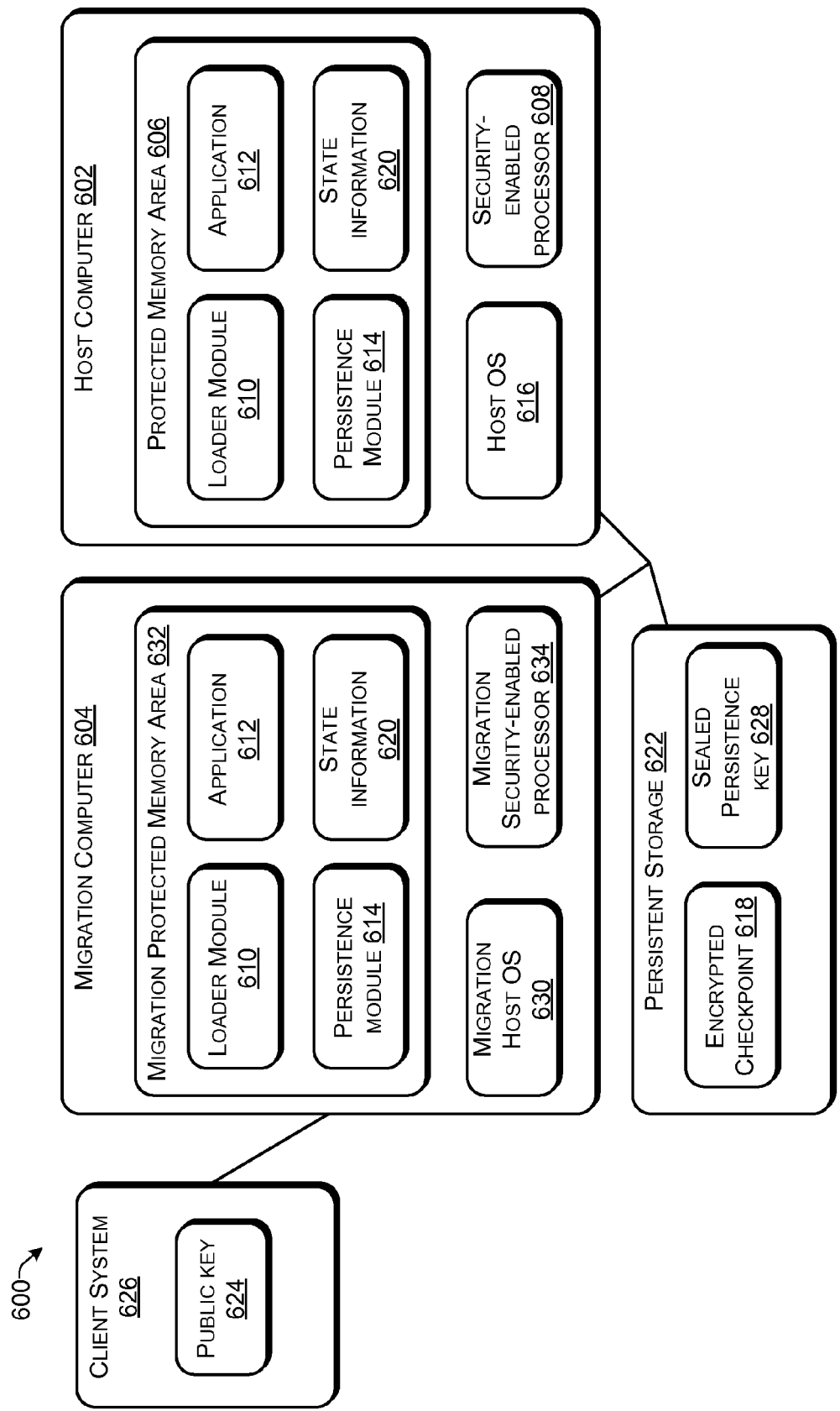
FIG. 6 shows an environment for migration of a protected memory area according to embodiments.
Figure 7:
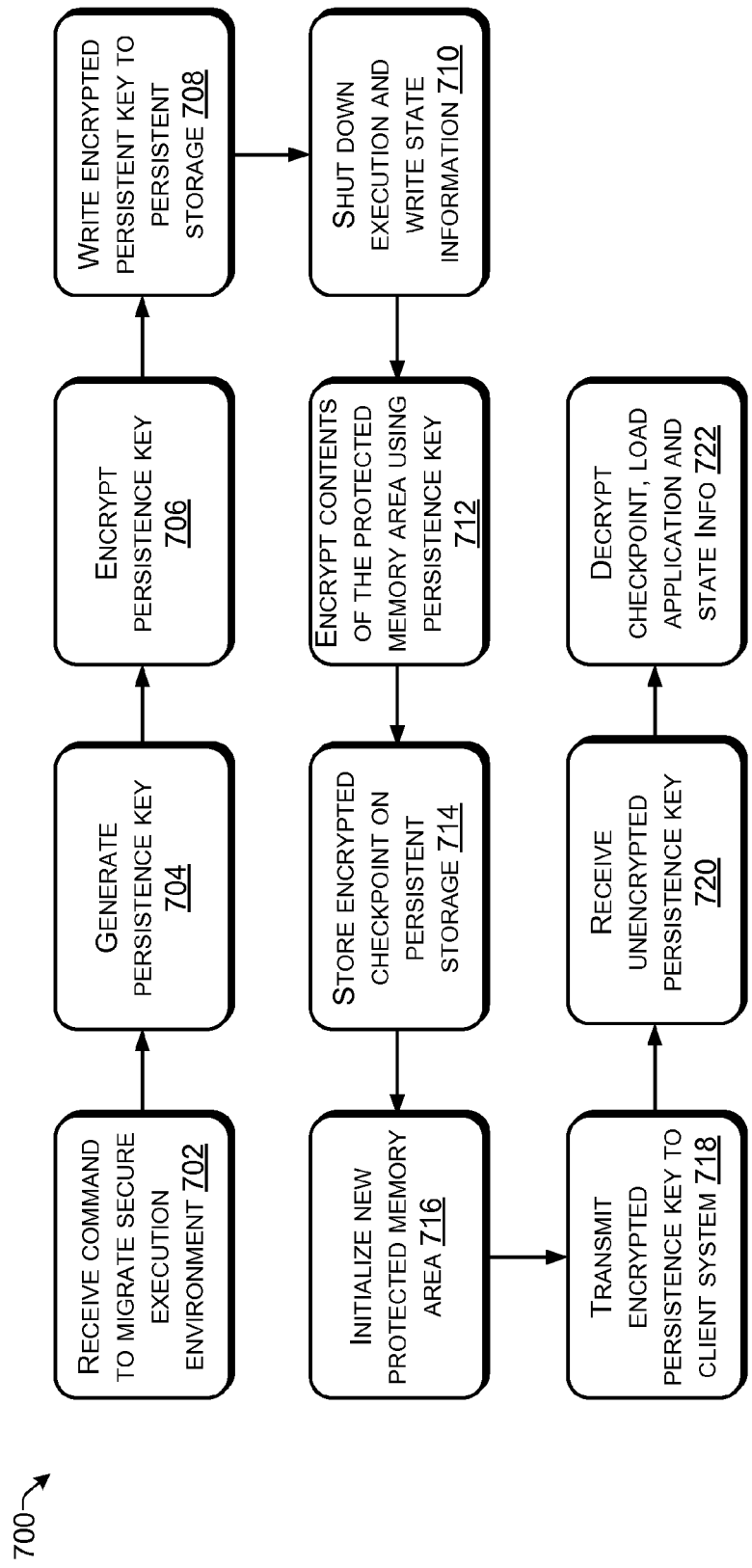
FIG. 7 is a flow diagram showing an example process for migrating a secure execution environment.
Figure 8:
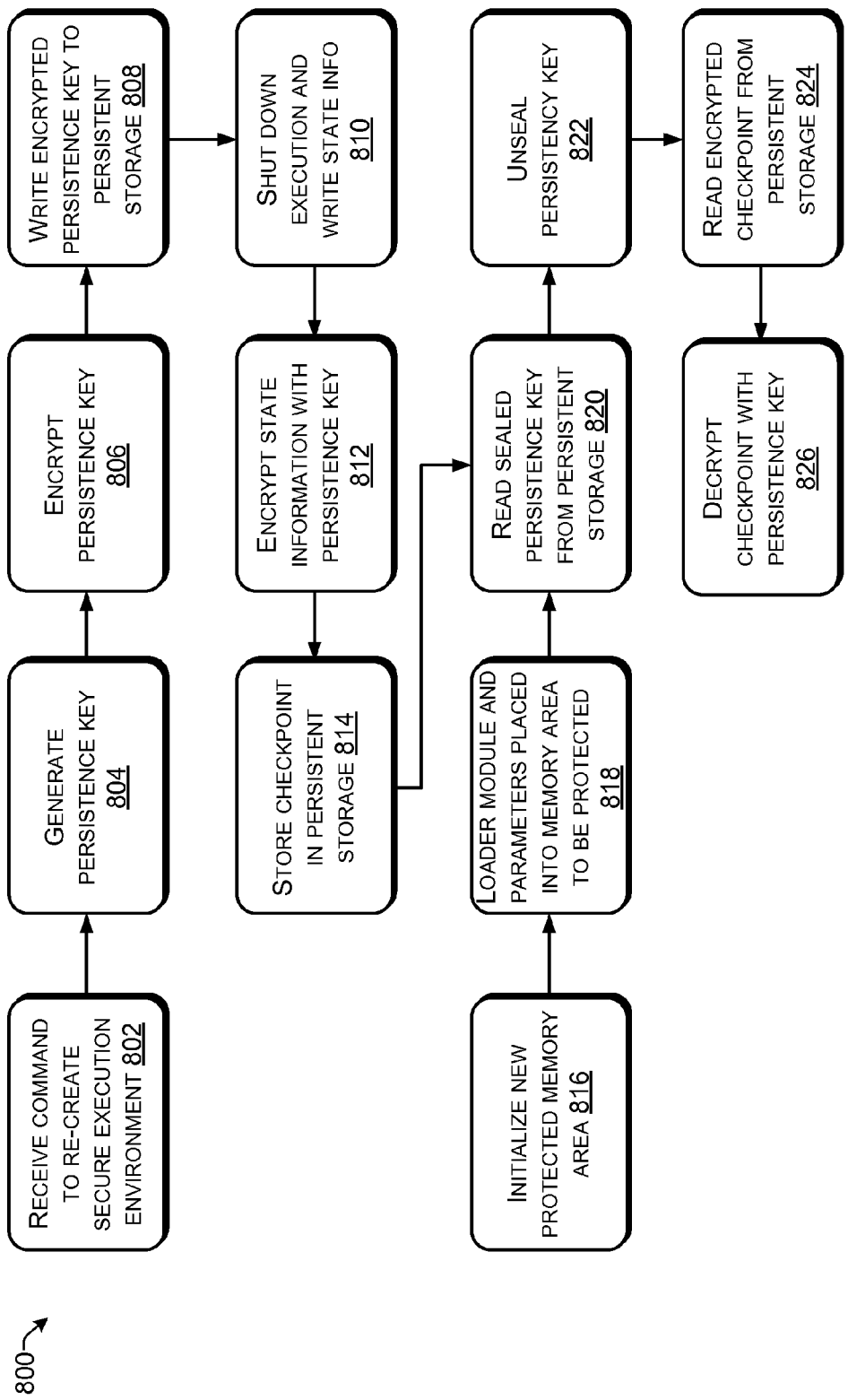
FIG. 8 is a flow diagram showing an example process for re-creating a secure execution environment.

Memory 304 may also include a client-side persistence module 326 configured to perform one or more functions associated with persisting the secure execution environment such as, for example, in order to migrate the secure execution environment between computers in an application hosting service, or in order to re-create the secure execution environment on the same computer in the application hosting service, as is described in more detail with respect to FIGS. 6-8. Such client-side persistence functions include receiving a persistence key as part of a migration of a secure execution environment, decrypting the persistence key with a private key of the computing system 300, and transmitting the unencrypted persistence key to a persistence module, such as persistence module 614, residing on a migration computer of an application hosting service, such as migration computer 604.

Example Operations for Instantiating a Secure Execution Environment

Figure 4:
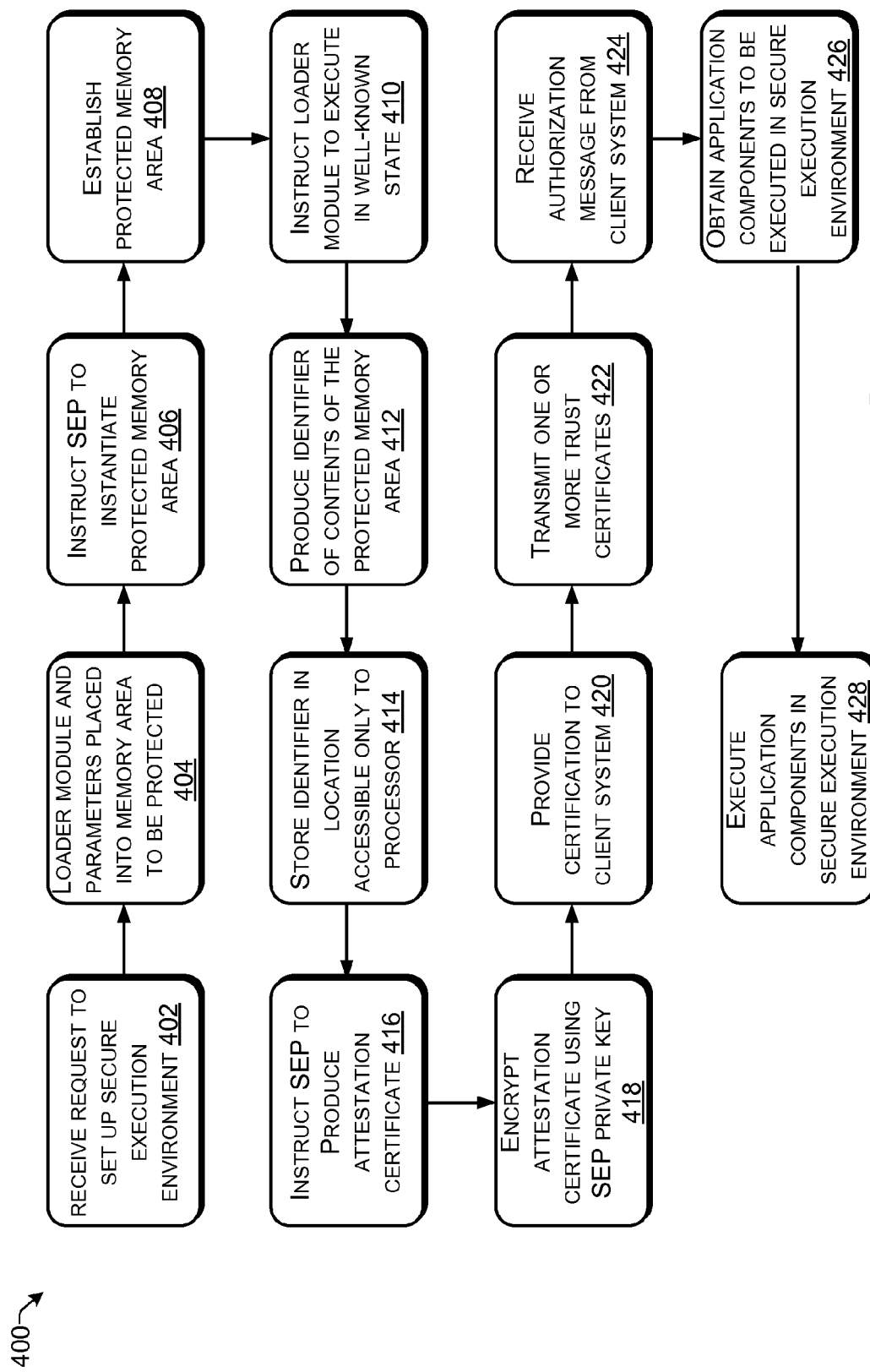
FIG. 4 is a flow diagram showing an example process for instantiating a secure execution environment.

FIG. 4 is a flow diagram showing an example process 400 performed by an application hosting service for instantiating a secure execution environment. At 402, a set-up module, such as the set-up module 110, receives a request from a client system to establish a secure execution environment on an application hosting service, such as the application hosting service 102. The request includes an indication of a loader module, such as the loader module 116, and one or more parameters, such as parameters 118. The indication of the loader module may be a URI or URL (or other identifier type) for the loader module, or it may be an application binary of the loader module, application package, and so forth. The parameters may indicate an application requested to be run in the secure execution environment. The parameters may be an application binary of the application requested to be run in the secure execution environment. The parameters may be some other parameter that the client system requests to be placed into a protected memory area of the secure execution environment. In various embodiments, the parameters may be omitted from the request.

At 404, the host operating system places the loader module and the parameters into an area of memory to be protected.

At 406, the set-up module instructs a security-enabled processor (SEP) of the application hosting service, such as the security-enabled processor 106, to instantiate, in response to the request, a protected memory area that includes the loader module and one more parameters identified by the request.

At 408, the security-enabled processor establishes a protected memory area by putting the area of memory that includes the loader module and the parameters into a protected state. The protected memory area is placed into a well-known initial state. The well-known initial state may be all memory cells of the protected memory area, and all processor registers, are all written to zero, to one, or to some other predetermined value or pattern of values. As described elsewhere within this Detailed Description, data stored in the protected memory area is inaccessible to code stored and executed outside the protected memory area once the security-enabled processor puts the protected memory area into the well-known initial state. It is the security-enabled processor that governs this access.

At 410, the set-up module instructs the loader module to execute within the protected memory area. The set-up module may be able to pass instruction to the loader module through an entry gate or function provided by the security-enabled processor that enables the secure execution environment to receive communication from the outside execution environment.

At 412, the security-enabled processor produces an identifier of the contents of the protected memory area. The identifier may be, in various embodiments, a digest—such as a hash—of the contents of the protected memory area in the activation state. The identifier may be a public key matching a private key used to sign the software stored in the protected memory area. At the point where the identifier is created, the contents of the protected memory area includes the loader module and the one or more parameters included in the request, but no other data or code. Thus, the content of the protected memory area represents the requested activation state implicitly or explicitly identified by the request. In embodiments where the identifier is a digest, the digest may be produced using one of various hash functions, or other similar cryptographic functions.

At 414, the security-enabled processor stores the identifier in a manner that is accessible only to the security-enabled processor. For example, the security-enabled processor may store the identifier in a secure register of the security-enabled processor. The security-enabled processor may store the identifier encrypted in a memory location. But in any event, the identifier is stored in a way that makes it accessible only to the security-enabled processor. The identifier may be created upon instruction by the loader module. In alternative embodiments, the identifier may be created upon instantiation of the protected memory area without instruction from the loader module.

At 416, an instance of the loader module executing in the secure execution environment instructs the security-enabled processor to produce an attestation certificate including the identifier and signed by a private key of the security-enabled processor. The private key of the security-enabled processor is securely stored in the security-enabled processor in a way that is accessible only to the security-enabled processor. The attestation certificate may include other information besides the identifier, such as a time-stamp, the one or more parameters, or other data.

At 418, the security-enabled processor encrypts/signs the attestation certificate using the private key of the security-enabled processor and provides the signed attestation certificate to the loader module executing in the secure execution environment.

At 420, the loader module provides the client system with certification that the secure execution environment is established in an initial activation state to execute only that software identified by the client system request. The certification may include a signed attestation certificate. The loader module may transmit the attestation certificate via an exit gate or function of the security-enabled processor that enables the secure execution environment to communicate with code outside of the secure execution environment.

At 422, the loader module and/or the application hosting service transmits one or more trust certificates, such as TA certificate 132 and intermediate certificates 134 that collectively vouch for the identity of the security-enabled processor and/or indicate that the security-enabled processor is secure. This may also include an auditing certificate, signed by a private key of an auditor entity, indicating that the security-enabled processor is physically intact. This may include a processor certificate from a manufacturer of the security-enabled processor indicating that the security-enabled processor is secure. In alternative embodiments, the auditing certificate and/or the processor certificate are delivered separately to the client system, such as directly from the auditing entity, a hardware manufacturer, or third party. In one non-limiting example, the attestation certificate may include a URI identifying where the client system can retrieve the auditing certificate.

At 424, the loader module receives an authorization message from the client system.

At 426, the loader module obtains one or more application components to be executed in the secure execution environment. Obtaining one or more application components may include retrieving the one or more application components from a persistent storage of the application hosting service, from a remote location (such as via a URI identified in the parameters of the initial activation state or the authorization message, or in some other location). Obtaining one or more application components may include retrieving the one or more application components from the client system, such as via a cryptographically protected communication channel.

The one or more application components are selected by the client system, either by transmitting a URI, URL, other identifier, or an application binary, application package, or file-system image. Transmission of the URI, URL, other identifier, application binary, application package, file-system image, and so forth may be done via the request received at 402, in the authorization message received at 424, or received in some other manner such as via a secure communication connection established between the loader module and the client system channel (using for example secure socket layer (SSL) protocol or other protocol).

In various non-limiting embodiments, the client system provides the loader module with an encryption key. In these embodiments, obtaining the one or more application components may include decrypting the one or more components using the encryption key (received through a secure communication channel). In various embodiments, the encryption key may be transported in the clear over a secure communication channel. In other embodiments the encryption key may be encrypted with the public key of the security-enabled processor and decrypted by the security-enabled processor on behalf of the loader module. In various embodiments, obtaining the one or more application components at 426 may occur in a different sequence than is shown in FIG. 4 without departing from the scope of the present disclosure. In one non-limiting example of such alternative embodiments, the one or more application components may have been obtained and loaded into the protected memory area as part of the initial activation state. At 428, the loader module causes the security-enabled application to execute the obtained one or more application components within the protected memory area.

Example Operations for Verifying Secure Execution Environment Establishment

Figure 5:
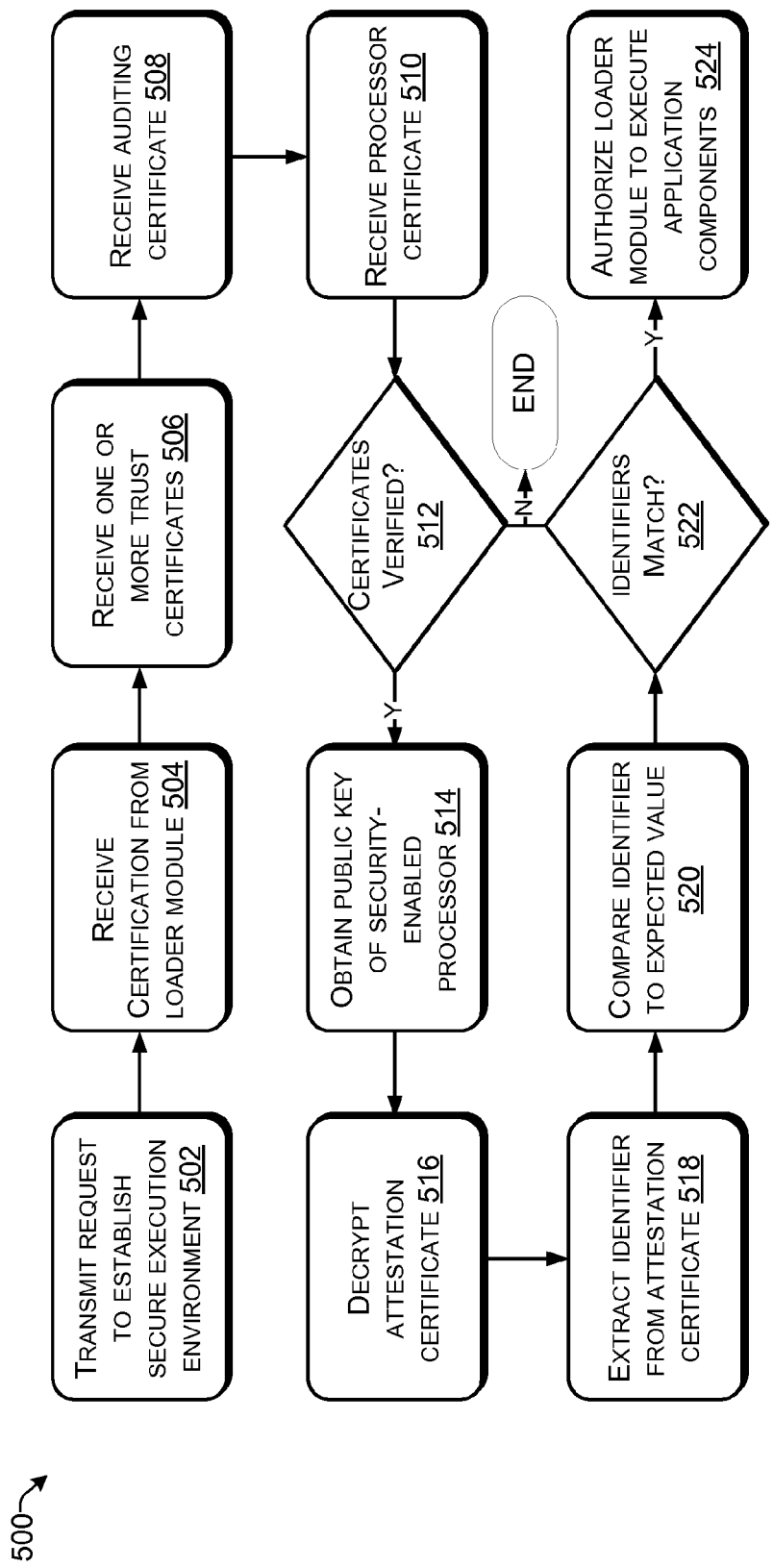
FIG. 5 is a flow diagram showing an example process for verifying establishment of a secure execution environment.

FIG. 5 is a flow diagram showing an example process 500 for verifying establishment of a secure execution environment. At 502, a client system, such as client system 112, transmits a request to an application hosting service, such as the application hosting service 102, to establish a secure execution environment. The request includes an indication of a requested activation state of the secure execution environment, such as a requested loader module and one or more parameters to be loaded into a protected memory area of the secure execution environment.

At 504, the client system receives, from an instance of the loader module executing in a protected memory area of the application hosting service, a certification, such as an attestation certificate, that the secure execution environment is established to execute in the activation state only the software identified by the request. The attestation certificate includes an identifier. Receipt of the attestation certificate indicates that the application hosting service purports to have established a secure execution environment. The identifier identifies the contents of a protected memory area of the secure execution environment upon its instantiation. The identifier may be, in various embodiments, a digest—such as a hash—of the contents of the protected memory area in the activation state. The identifier may be a public key matching a private key used to sign the software stored in the protected memory area.

At 506, the client system receives one or more trust certificates, such as the TA certificate 132 and/or the intermediate certificates 134. As described elsewhere within this Detailed Description, the one or more trust certificates verifiably and collectively establish a chain of trust between a trusted authority and the security-enabled processor of the application hosting service to indicate that the security-enabled processor is secure.

At 508, the client system receives an auditing certificate, signed by a private key of an auditor entity, indicating that the security-enabled processor is physically uncompromised. The auditor entity periodically inspects the security-enabled processors of the application hosting service as is described elsewhere within this detailed description.

At 510, the client system receives a processor certificate from a manufacturer of the security-enabled processor indicating that the security-enabled processor is secure. The processor certificate may be one of the trust certificates received at 506. Alternatively, the processor certificate may be separately received from the hardware manufacturer of the security-enabled processor—or third party—vouching for the security and proper functioning of the security-enabled processor.

At 512, the client system verifies that the various certificates received at 506, 508, and 510 are proper, such as by verifying their authenticity using the various issuers' public keys. If one or more of the certificates are invalid, then the client system may reject the secure execution environment as invalid.

At 514, the client system obtains a public key of the security-enabled processor. The client system may obtain the public key from one of the trust certificates received at 506. Alternatively, the client system may have pre-stored the public key of the security-enabled processor.

At 516, the client system verifies the attestation certificate using the known public key of a security-enabled processor of the application hosting service. The known public key corresponds to a private key of the security-enabled processor. Successful decryption with the public key therefore indicates that the attestation certificate is verifiably from the security-enabled processor.

At 518, the client system extracts the identifier from the decrypted attestation certificate. And at 520, the client system compares the identifier with an expected value of a known identifier of the requested activation state of the secure execution environment. A successful match indicates that the activation state of the secure execution environment instantiated by the security-enabled processor of the application hosting service is as specified in the request transmitted at 502.

At 522, the client system determines whether the identifiers match. If the identifiers do not match, then the client system rejects the secure execution environment for not having the requested activation state. Identifiers that do not match indicate that the actual activation state of the secure execution environment has less, more, or different code and data than the requested activation state. A successful match of the identifiers, along with verification that the attestation and trust certificates are valid, permits the client system to have a high degree of confidence that a secure execution environment has been established with no untrusted code, such that for example the secure execution environment is established with only code and data that is trusted by the client system.

At 524, the client system authorizes the instance of the loader module executing in the protected memory area to execute one or more application components within the secure execution environment. In embodiments, authorizing the loader module may include transmitting an indicator of the one or more application components to be executed in the secure execution environment. The indicator may be a URI, URL, other identifier, or an application binary, application package, or file-system image of the one or more application components to be executed. In various embodiments, transmission of the indicator may be part of transmitting the request at 502. In other embodiments, transmitting the indicator may utilize a separate message (such as for example a message sent over a secure connection established using SSL or other protocol), or a message transmitted at some previous time in order to "pre-stage" the one or more application components to be executed in the secure execution environment. The client system may generate and transmit to the loader module an encryption key to be used to decrypt the various messages and/or the indicator.

Example Environment for Persistence of a Secure Execution Environment

In conventional hosted computing, migration or re-creation of a hosted consumer's execution is handled by a virtual machine monitor. In conventional hosted computing migration, a host virtual machine monitor inspects the state of the execution, copies all of the memory pages, writes the memory pages out to a disk or transfers them via a network, and starts up the execution on the same or a different machine But because code and data stored within a protected memory area of a secure execution environment according to embodiments of the present disclosure are inaccessible to code executing outside the protected memory area, a host OS is not able to inspect the state of execution or copy the state information to a disk in order to migrate to another machine Instead, the code running inside the protected memory area handles various aspects of the re-creation and migration processes.

FIG. 6 shows an environment for migration of a protected memory area according to embodiments. Environment 600 includes a host computer 602 and a migration computer 604. A secure execution environment, including a protected memory area 606 and a security-enabled processor 608, is established on host computer 602. The protected memory area 606 is instantiated in a manner that is described elsewhere within this Detailed Description, in particular in the descriptions of FIGS. 1-5. The protected memory area 606 includes a loader module 610 and an application 612 that executes within the secure execution environment. The protected memory area 606 also includes a persistence module 614, which may be a sub-component of the loader module 610 or a subcomponent of the application 612, including a subcomponent of a library OS subcomponent of the application 612.

The host OS 616 determines that there is a need to persist the secure execution environment. Persisting the secure execution environment may be for the purpose of migrating the secure execution environment from the host computer 602 to the migration computer 604. Alternatively, persisting the secure execution environment may be for the purpose of re-creating the execution on the host computer 602. In any event, the host OS 616 is configured to call an entry gate or function provided by the security-enabled processor 608 which permits the host OS 616 to instruct the secure execution environment to persist its present execution state to persistent storage.

The persistence module 614 receives the persistence instruction via the entry gate and, in response, creates an encrypted checkpoint 618. To accomplish this, the persistence module 614 shuts down execution of the loader module 610 and the application 612 (including for example causing the threads to quiesce) and writes the processor registers to protected memory. At that point, only one thread—the suspend thread of the persistence module 614—may be left running. The various memory pages are enumerated and stored, along with the processor registers, as state information 620. The contents of the protected memory area 606, including the application 612 and the state information 620, are stored as the encrypted checkpoint 618 on persistent storage 622. The encrypted checkpoint 618 is encrypted with a persistence key that is generated by the persistence module 614. The persistence module 614 encrypts the persistence key using a public key 624 of the client system 626. Alternatively, the persistence key is encrypted using a public key of the migration security-enabled processor 634 or a public key of the security-enabled processor 608. The encrypted persistence key is stored as sealed persistence key 628 in persistent storage 622.

In embodiments that utilize the persistence of the execution state to migrate the execution to the migration computer 604, a migration host OS 630 of the migration computer 604 causes a migration protected memory area 632 to be established. In embodiments that utilize the persistence of the execution state to re-create the execution on the host computer 602 in a new protected memory area (due to, for example, a reboot of the host computer 602 or for other reason), the host OS 616 causes a new protected memory area to be established on host computer 602. The migration protected memory area 632, or the new protected memory area to be established on host computer 602, is instantiated in a manner that is described elsewhere within this Detailed Description, in particular in the descriptions of FIGS. 1-5.

In embodiments where the persistence of the execution state is for the purpose of migrating it to migration computer 604, the migration host OS 630 calls an entry gate or function of the migration security-enabled processor 634 to cause the loader module 610 to launch or execute the persistence module 614 within the migration protected memory area 632. The persistence module 614 copies the sealed persistence key 628 into the migration protected memory area 632 and transmits the sealed persistence key 628 to the client system 626. The client system 626 decrypts the sealed persistence key 628 using the private key of the client system 626 and transmits it back to the persistence module 614 via the encrypted connection established during the initialization of the secure execution environment on the migration computer 604. Alternatively, in embodiments that encrypt the persistence key with the public key of the migration security-enabled processor 634, the sealed persistence key is unsealed using the private key of the migration security-enabled processor 634.

In embodiments that utilize the persistence of the execution state for the purpose of re-creating the execution on the host computer 602, the host OS 616 calls an entry gate or function of the security-enabled processor 608 to cause the loader module 610 to launch or execute the persistence module 614 within a newly re-created protected memory area 606. The persistence module 614 copies the sealed persistence key 628 into the newly-recreated protected memory area 606 and transmits the sealed persistence key 628 to the client system 626. The client system 626 decrypts the sealed persistence key 628 using the private key of the client system 626 and transmits it back to the persistence module 614 via the encrypted connection established during the initialization of the secure execution environment on the migration computer 604. Alternatively, in embodiments that encrypt the persistence key with the public key of the security-enabled processor 608, the sealed persistence key is unsealed using the private key of the security-enabled processor 608.

The persistence module 614 copies the encrypted checkpoint 618 into the migration protected memory area 632 or the newly-recreated protected memory area 606 and uses the unsealed persistence key to decrypt the encrypted checkpoint 618. The persistence module 614 uses the state information 620 from the encrypted checkpoint 618 to repopulate the memory pages associated with the executing threads from the loader module 610 and the application 612, and to repopulate the registers in the migration security-enabled processor 634 or the security-enabled processor 608. Thus, in various embodiments, the execution of the secure execution environment on the host computer 602 is either migrated to the migration computer 604, or re-created on the host computer 602.

In various embodiments, the secure execution environment on migration computer 604 can be instantiated before migration processes begin, such as at the same time that the secure execution environment on host computer 602 is initialized. The persistence module 614 on the migration protected memory area 632 can be pre-populated with the private key of the client system 626 to enable it to decrypt the sealed persistence key 628 without transmitting it to the client system 626 for unsealing. In some embodiments, instead of using the public key of the client system 626 to encrypt the persistence key, the sealed persistence key 628 is encrypted using a public key of the migration security-enabled processor 634 so that it can be decrypted using the private key of the migration security-enabled processor 634.

Example Operations for Migrating a Secure Execution Environment

FIG. 7 is a flow diagram showing an example process 700 for migrating a secure execution environment. At 702, a loader module or a persistence module executing in a secure execution environment receives a command, via an entry gate, to migrate to a migration computer, such as migration computer 604.

At 704, a persistence module, such as the persistence module 614, generates a persistence key. The persistence key is used to encrypt a checkpoint of the secure execution environment.

At 706, the persistence module encrypts the persistence key. In embodiments, the persistence module encrypts the persistence key using a public key of a client system, such as the client system 626. In alternative embodiments, where the identity of the host migration computer is known, the persistence module encrypts the persistence key using a public key of a security-enabled processor of the migration computer.

At 708, the persistence module writes the encrypted persistence key to persistent storage. Alternatively, the persistence module transmits the persistence key to the client system, or to a pre-established secure execution environment on the migration computer.

At 710, the persistence module shuts down execution of the processes and threads executing in the secure execution environment and writes state information to the protected memory area.

At 712, the persistence module encrypts the contents of the protected memory area using the persistence key to generate a checkpoint. The contents of the protected memory area include the state information, such as the page files and register data associated with the secure execution environment.

At 714, the encrypted checkpoint is stored on a persistent storage, such as a hard disk drive of the application hosting service or some other persistent storage. Alternatively, the encrypted checkpoint is loaded directly into a pre-established protected memory area of the migration computer, such as over an encrypted communication channel to the protected memory area of the migration computer.

At 716, the protected memory area is initialized on the migration computer. The host operating system of the migration computer causes the loader module in the protected memory area of the migration computer to load and execute the persistence module within the secure execution environment of the migration computer.

At 718, the persistence module executing within a secure execution environment of the migration computer transmits the encrypted persistence key to the client system. In alternative embodiments, where the persistence key is encrypted using the public key of the security-enabled processor of the migration computer, the persistence key is not transmitted to the client system; instead, the persistence module requests that the security-enabled processor decrypt the persistence key. In still another alternative embodiment, where the secure execution environment is pre-established on the migration computer, the pre-established secure execution environment on the migration computer may already have the private key of the client system, obviating the need to transmit the encrypted persistence key to the client system. At 720, the secure execution environment on the migration computer receives the unencrypted persistence key.

At 722, the persistence module decrypts the encrypted checkpoint using the persistence key, and loads the state information in the checkpoint into the page files and registers of the new secure execution environment to restore the state of execution, and the migration process completes.

Example Operations for Re-Creating a Secure Execution Environment

FIG. 8 is a flow diagram showing an example process for re-creating a secure execution environment. At 802, a loader module or a persistence module executing in a secure execution environment receives a command, via an entry gate, to persist the present state of the secure execution environment to re-create the execution state in a new secure execution environment (such as on the same or different host computer).

At 804, a persistence module generates a persistence key. The persistence key is used to encrypt a checkpoint of the secure execution environment as described in more detail below.

At 806, the persistence module encrypts the persistence key. In embodiments, the persistence module encrypts the persistence key using a public key of a client system, such as the client system 626. In alternative embodiments, the persistence module encrypts the persistence key using a public key of a security-enabled processor of the host computer.

At 808, the persistence module writes the encrypted persistence key to persistent storage. Alternatively, the persistence module transmits the persistence key to the client system, or to a pre-established secure execution environment on the host computer, such as over a secure communication channel to the newly-created protected memory area of the pre-established secure execution environment.

At 810, the persistence module shuts down execution of the secure execution environment and writes the state information to the protected memory area. The state information may include the virtual memory pages and register context associated with the secure execution environment. At 812, the persistence module encrypts the state information using the persistence key to generate a checkpoint.

At 814, the encrypted checkpoint is stored on a persistent storage, such as a hard disk drive of the application hosting service or some other persistent storage. Alternatively, the encrypted checkpoint is loaded directly into a newly-established protected memory area, such as over a communication channel to the newly-created protected memory area.

At 816, a new protected memory area is initialized on the host computer. At 818, the host operating system of the host computer places the loader module and one or more parameters into the memory area to be protected.

At 820, the persistence module executing within the newly-created secure execution environment of the host computer reads the sealed persistence key from persistent storage.

At 822, the persistence module in the newly-created secure execution environment unseals the persistence key. In embodiments where the persistence key is encrypted using the public key of the security-enabled processor of the host computer, the persistence module requests that the security-enabled processor decrypt the persistence key. In other embodiments where the secure execution environment is pre-established on the host computer, the private key of the security-enabled processor of the host computer is used to unseal the persistence key.

At 824, the persistence module reads the encrypted checkpoint from the persistent storage. At 826, the persistence module decrypts the encrypted checkpoint using the persistence key, and loads the state information in the checkpoint into the virtual memory and register context of the new secure execution environment to restore the state of execution, and the re-creation process completes.

FIGS. 4, 5, 7, and 8 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, memories 204 and 304 of the computing systems 200 and 300 in FIGS. 2 and 3, respectively, may include volatile memory (such as random access memory (RAM)) and/or non-volatile memory (such as read-only memory (ROM), flash memory, etc.). Memories 204 and 304 may also include additional removable storage and/or non-removable storage including, but not limited to, flash memory, magnetic storage, optical storage, and/or tape storage that may provide non-volatile storage of computer-readable instructions, data structures, program modules, and other data for computing systems 200 and 300.

Memories 204 and 304 are examples of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
providing a first instruction that causes a security-enabled processor of a computing system to establish a hardware-protected memory area within a memory of the computing system, the security-enabled processor configured to mediate, via one or more gate functions, access to the hardware-protected memory area by all code that executes outside of the hardware-protected memory area; and
providing a second instruction that causes the security-enabled processor, based at least on a request of a client system, to include, in an initial state, software and data identified by the request of the client system in the hardware-protected memory are; instructing a portion of the software indentified by the request of the client system that is included in the hardware-protected memory area to execute, the portion of the software configured, upon execution, to cause the security-enabled processor to perform the act of generating cryptographic certification of all of contents of the hardware-protected memory area in the initial state;
receiving the cryptographic certification from the security-enabled processor, at least a portion of the cryptographic certification including an attestation created by the security-enabled processor using a private key of the security-enabled processor; and
providing the cryptographic certification to the client system, the cryptographic certification used by the client system based on a comparison of at least the portion of the cryptographic certification to a known cryptographic indication of the software and data identified in the request in the initial state, to determine that the contents of the hardware-protected memory area includes, in the initial state, only the software and data identified in the request, the attestation used by the client system, based at least on a public key associated with the security-enabled processor, to determine that the cryptographic certification of all contents of the hardware-protected memory area in the initial state was created by the security-enabled processor.

2. The method of claim 1, wherein the cryptographic certification includes a hash or a digest of all the contents of the hardware-protected memory area in the initial state.

3. The method of claim 1, wherein the data identified in the request of the client system includes one or more parameters identified by the client system, and wherein the cryptographic certification is further used by the client system to determine that the initial state includes no parameters other than the one or more parameters.

4. The method of claim 1, further comprising providing, to the client system, an auditing certificate, signed by another private key of an auditor entity, the auditing certificate indicating that the security-enabled processor is physically intact.

5. The method of claim 1, wherein the attestation includes one or more trust certificates, including a trust certificate from a trusted authority, the one or more trust certificates collectively used by the client system to determine that the security-enabled processor is of a type that mediates access to the hardware-protected memory area by all code that executed outside of the hardware-protected memory area and that encrypts all the contents of the hardware protected memory area.

6. The method of claim 1, wherein the attestation includes a processor certificate from a manufacturer of the security-enabled processor, the processor certificate indicating that the security-enabled processor is of a type that mediates access to the hardware-protected memory area by all of the code that executes outside of the hardware-protected memory area.

7. One or more computer-readable storage devices comprising a plurality of programming instructions that is executable by one or more processors to cause a computing system to:
transmit a request to an application hosting service, the request for a security-enabled processor of the application hosting service to establish a hardware-protected memory area of a memory of the application hosting service, the request identifying software and data to be included in the hardware-protected memory area in an initial state, the security-enabled processor configured to mediate access to the hardware-protected memory area by all code that is executed outside of the protected memory area, the security-enabled processor configured to encrypt all contents of the hardware-protected memory area, a portion of the software to be included in the hardware-protected memory are executable to cause the security-enabled processor to generate a cryptographic certification of all of the contents of the hardware-protected memory area in the initial state;
receive the cryptographic certification from the application hosting service, the cryptographic certification including at least an attestation created by the security-enabled processor using a private key of the security-enabled processor;
determine, based at least on a comparison of at least a portion of the cryptographic certification to a known cryptographic indication of the software and data in the initial state, that only the software and data identified by the request is included in the hardware-protected memory area in the initial state; and
determine, based at least on the attestation and a public key of the security-enabled processor, that the cryptographic certification of all of the contents of the hardware-protected memory area in the initial state is generated by the security-enabled processor.

8. The one or more computer-readable storage devices of claim 7, wherein the plurality of programming instructions is further executable to cause the computing system to receive from the application hosting service cryptographic certification that the security-enabled processor is physically secure.

9. The one or more computer-readable storage devices of claim 7, wherein the plurality of programming instructions is further executable to cause the computing system to instruct the application hosting service to load one or more application components into the hardware-protected memory area, the one or more application components different from the software that is identified by the request and that is included in the hardware-protected memory area in the initial state.

10. The one or more computer-readable storage devices of claim 7, wherein the identifier includes at least a hash of the contents of the hardware-protected memory area in the initial state.

11. The one or more computer-readable storage devices of claim 7, wherein the plurality of programming instructions is further executable to cause the computing system to receive an auditing certificate, signed by another private key of an auditor entity, indicating that the security-enabled processor is physically uncompromised.

12. The one or more computer-readable storage devices of claim 7, wherein the cryptographic certification includes one or more trust certificates, including a trust certificate from a trusted authority, that collectively indicate that the security-enabled processor is of a type that mediates access to the hardware-protected memory area by all of the code that is executed outside of the hardware-protected memory area.

13. The one or more computer-readable storage devices of claim 7, wherein the cryptographic certification includes a processor certificate, from a manufacturer of the security-enabled processor, that indicates that the security-enabled processor is of a type that mediates access to the hardware-protected memory area by the code that is executed outside of the protected memory area.

14. A computing system comprising:
a memory;
one or more processors, including a security-enabled processor configured to establish a hardware-protected memory area in the memory, wherein the security-enabled processor is configured to mediate access to the hardware-protected memory area by processes that execute outside of the protected memory area, that security-enabled processor further configured to encrypt all contents of the hardware-protected memory area; and
one or more modules stored on the memory and executable by the one or more processors to:
receive a request from a client system to establish the hardware-protected memory area, the request including an indication of software and data to be loaded in the hardware-protected memory area in an initial state;
cause, at least partly in response to the request, the security-enabled processor to instantiate the hardware-protected memory area and to include in the hardware-protected memory area the software and data in the initial state;
cause an instance of a loader module of the software to execute, the loader module configured, upon execution, to transmit to the client system cryptographic certification, signed by a private key of the security-enabled processor, that includes an indicator used by the client system, based on a comparison of the indicator to a known indicator of the software and data in the initial state, that the activation state of the secure execution environment of the hardware-protected memory area includes only the software and data indicated by the request in the initial state, the cryptographic certification further used by the client system, based at least on a public key of the security-enabled processor, to determine that the security-enabled processor generated the indicator.

15. The computing system of claim 14, wherein the private key of the security-enabled processor is stored on the security-enabled processor in a way that is accessible to the security-enabled processor but not to any other components of the computing system.

16. The computing system of claim 14, wherein the one or more modules are further executable by the one or more processors to receive an encryption key encrypted with a public key of the security-enabled processor that corresponds to the private key of the security-enabled processor, and to obtain, using the encryption key, one or more application components to be executed in the hardware-protected memory area.

17. The computing system of claim 14, wherein the indicator includes a digest of all contents of the hardware-protected memory area in the initial state and a public key corresponding to the private key that was used to sign the cryptographic certification.

18. The computing system of claim 14, wherein the data indicated in the request includes a parameter indicating an application of the software to be loaded into the hardware-protected memory area, and wherein the software and data in initial state further includes one or more of the parameter and the application.

19. The computing device of claim 14, wherein the one or more modules are further executable by the one or more processors to transmit, to the client system, an auditing certificate, signed by another private key of an auditor entity, indicating that the security-enabled processor has not been tampered with.

20. The method of claim 1, wherein the security-enabled processor is configured to encrypt all of the contents of the hardware-protected memory area, and wherein mediation of the access to the hardware-protected memory area includes decrypting portions of the contents of the hardware-protected memory area.

* * * * *